United States Patent
Zieger et al.

(10) Patent No.: US 9,581,255 B2
(45) Date of Patent: Feb. 28, 2017

(54) MULTIPLE PROPORTION DELIVERY SYSTEMS AND METHODS

(71) Applicants: Claus Dieter Zieger, Rancho Palos Verdes, CA (US); Niclas Henning Zieger, Rancho Palos Verdes, CA (US); Guenther Buzzi, Schiltach (DE)

(72) Inventors: Claus Dieter Zieger, Rancho Palos Verdes, CA (US); Niclas Henning Zieger, Rancho Palos Verdes, CA (US); Guenther Buzzi, Schiltach (DE)

(73) Assignee: Henning, Inc., Pasadena, CA (US)

( * ) Notice: Subject to any disclaimer, the term of this patent is extended or adjusted under 35 U.S.C. 154(b) by 42 days.

(21) Appl. No.: 14/417,112

(22) PCT Filed: Jul. 23, 2013

(86) PCT No.: PCT/US2013/051738
§ 371 (c)(1),
(2) Date: Jan. 23, 2015

(87) PCT Pub. No.: WO2014/018564
PCT Pub. Date: Jan. 30, 2014

(65) Prior Publication Data
US 2015/0219225 A1    Aug. 6, 2015

Related U.S. Application Data

(60) Provisional application No. 61/674,777, filed on Jul. 23, 2012.

(51) Int. Cl.
*F16K 11/20* (2006.01)
*F16K 11/10* (2006.01)
(Continued)

(52) U.S. Cl.
CPC ............. *F16K 11/10* (2013.01); *E03C 1/0408* (2013.01); *E03C 1/055* (2013.01); *F16K 11/14* (2013.01);
(Continued)

(58) Field of Classification Search
CPC ................... Y10T 137/9464; Y10T 137/87096
See application file for complete search history.

(56) References Cited

U.S. PATENT DOCUMENTS 1,379,025 A * 5/1921 Jones .................... F16K 11/202
137/635
1,656,448 A * 1/1928 Schumacher ......... F16K 11/165
137/637

(Continued)

FOREIGN PATENT DOCUMENTS

DE          43 09 409      9/1994
DE      2020050 08 889     9/2005

OTHER PUBLICATIONS

International Search Report mailed Oct. 31, 2013, from related International Application No. PCT/US2013/051738.

*Primary Examiner* — R. K. Arundale
(74) *Attorney, Agent, or Firm* — Foley & Lardner LLP

(57) ABSTRACT

A valve that includes a control spline positioned to move from a first position to a second position and the control spline being axially rotatable in both the first position and second position. The valve also includes a portion of a first fluid mixing cartridge rotatably coupled to at least one portion of the control spline when the control spline is in the second position. The valve includes a portion of a second fluid mixing cartridge rotatably coupled to the at least one portion of the control spline when the control spline is in the second position and the first fluid mixing cartridge is configured to rotate in a different direction than the second fluid (Continued)

mixing cartridge when the control spline is in the second position.

14 Claims, 25 Drawing Sheets

(51) Int. Cl.
  *F16K 11/14* (2006.01)
  *E03C 1/04* (2006.01)
  *E03C 1/05* (2006.01)
  *F16K 11/00* (2006.01)
(52) U.S. Cl.
  CPC ...... *F16K 19/006* (2013.01); *Y10T 137/86823* (2015.04); *Y10T 137/87096* (2015.04)

(56) References Cited

U.S. PATENT DOCUMENTS

| | | | |
|---|---|---|---|
| 1,733,054 A | 10/1929 | Crill | |
| 2,949,240 A | 8/1960 | Koolnis | |
| 2,980,140 A * | 4/1961 | McMillan | F16K 11/10 137/607 |
| 3,034,138 A | 5/1962 | Filliung | |
| 3,411,537 A | 11/1968 | Gladstone et al. | |
| 3,933,639 A | 1/1976 | Pollastri et al. | |
| 3,936,891 A | 2/1976 | Kulde | |
| 3,965,494 A | 6/1976 | Baker | |
| 4,022,242 A | 5/1977 | Turecek | |
| 4,042,984 A | 8/1977 | Butler | |
| 4,084,271 A | 4/1978 | Ginsberg | |
| 4,085,308 A | 4/1978 | Youngquist | |
| 4,095,610 A | 6/1978 | Priesmeyer | |
| 4,104,114 A | 8/1978 | Rowlandson et al. | |
| 4,112,586 A | 9/1978 | Lehtinen | |
| 4,150,787 A | 4/1979 | Braathen | |
| 4,150,869 A | 4/1979 | Hansen | |
| 4,153,954 A | 5/1979 | Jacuzzi et al. | |
| 4,181,767 A | 1/1980 | Steinau | |
| 4,192,331 A | 3/1980 | Koering | |
| 4,192,332 A | 3/1980 | Feldmeier | |
| 4,195,416 A | 4/1980 | Hall | |
| 4,202,280 A | 5/1980 | Bereiter et al. | |
| 4,220,175 A | 9/1980 | Keller et al. | |
| 4,221,441 A | 9/1980 | Bain | |
| 4,225,991 A | 10/1980 | Bolton et al. | |
| 4,243,690 A | 1/1981 | Murakami et al. | |
| 4,262,842 A | 4/1981 | Grover et al. | |
| 4,278,698 A | 7/1981 | Maurer | |
| 4,279,935 A | 7/1981 | Kentor | |
| 4,281,790 A | 8/1981 | McGinnis | |
| 4,291,423 A | 9/1981 | Wilson | |
| 4,300,247 A | 11/1981 | Berg | |
| 4,304,292 A | 12/1981 | Cardone et al. | |
| 4,307,769 A | 12/1981 | Hauser et al. | |
| 4,370,543 A | 1/1983 | Nemeth | |
| 4,372,372 A | 2/1983 | Hunter | |
| 4,394,969 A | 7/1983 | Jette | |
| 4,398,308 A | 8/1983 | Berg | |
| 4,407,890 A | 10/1983 | Buzzi | |
| 4,409,694 A | 10/1983 | Barrett et al. | |
| 4,425,672 A | 1/1984 | Johnson et al. | |
| 4,425,906 A | 1/1984 | Ingestrom | |
| 4,436,571 A | 3/1984 | Nakanishi | |
| 4,436,703 A | 3/1984 | Lane | |
| 4,438,683 A | 3/1984 | Bartfield | |
| 4,439,274 A | 3/1984 | Goossens et al. | |
| 4,444,556 A | 4/1984 | Andersson | |
| 4,463,899 A | 8/1984 | Tacchi | |
| 4,475,573 A | 10/1984 | Hindman | |
| 4,509,550 A | 4/1985 | Monk | |
| 4,513,545 A | 4/1985 | Hopkins, Jr. | |
| 4,542,546 A | 9/1985 | Desgagnes | |
| 4,551,867 A | 11/1985 | Gurevich et al. | |
| 4,563,780 A | 1/1986 | Pollack | |
| 4,584,723 A | 4/1986 | Hussauf | |
| 4,597,737 A | 7/1986 | Raghavan et al. | |
| 4,606,370 A | 8/1986 | Geipel et al. | |
| 4,609,007 A | 9/1986 | Uhl | |
| 4,630,532 A | 12/1986 | Sonnentag et al. | |
| 4,651,720 A | 3/1987 | Baus | |
| 4,653,128 A | 3/1987 | Canalizo | |
| 4,654,900 A | 4/1987 | McGhee | |
| 4,664,613 A | 5/1987 | Tomatis | |
| 4,681,140 A | 7/1987 | Hayman | |
| 4,685,156 A | 8/1987 | Brabazon | |
| 4,696,428 A | 9/1987 | Shakalis | |
| 4,700,884 A | 10/1987 | Barrett et al. | |
| 4,718,128 A | 1/1988 | Fan | |
| 4,722,102 A | 2/1988 | Neugart | |
| 4,724,553 A | 2/1988 | Bianchi | |
| 4,730,640 A | 3/1988 | Moen | |
| 4,749,004 A * | 6/1988 | Peash | B64D 13/00 137/865 |
| 4,749,130 A | 6/1988 | Utzinger | |
| 4,768,705 A | 9/1988 | Tsutsui et al. | |
| 4,773,767 A | 9/1988 | Coll | |
| 4,778,104 A | 10/1988 | Fisher | |
| 4,782,853 A | 11/1988 | Moen | |
| 4,791,962 A | 12/1988 | Moen | |
| 4,801,091 A | 1/1989 | Sandvik | |
| 4,807,310 A | 2/1989 | Sedala | |
| 4,809,728 A | 3/1989 | Chen | |
| 4,819,587 A | 4/1989 | Tsutsui | |
| 4,832,065 A | 5/1989 | Tsubata | |
| 4,854,498 A | 8/1989 | Stayton | |
| 4,854,499 A | 8/1989 | Neuman | |
| 4,862,524 A | 9/1989 | Kimak | |
| 4,866,859 A | 9/1989 | Kopelman | |
| 4,869,427 A | 9/1989 | Kawamoto et al. | |
| 4,872,225 A | 10/1989 | Wagner | |
| 4,884,553 A | 12/1989 | Schwarzbacker | |
| 4,889,141 A | 12/1989 | Lindsey | |
| 4,890,548 A | 1/1990 | Grob | |
| 4,893,364 A | 1/1990 | Keeler | |
| 4,922,943 A | 5/1990 | Gill | |
| 4,923,116 A | 5/1990 | Homan | |
| 4,925,092 A | 5/1990 | Yoshida et al. | |
| 4,933,999 A | 6/1990 | Mikiya et al. | |
| 4,941,399 A | 7/1990 | Zucchetti | |
| 4,945,943 A | 8/1990 | Cogger | |
| 4,956,051 A | 9/1990 | Moreland | |
| 4,964,181 A | 10/1990 | Alpert | |
| 4,965,894 A | 10/1990 | Baus | |
| 4,974,501 A | 12/1990 | Grob et al. | |
| 4,979,530 A | 12/1990 | Breda | |
| 4,989,278 A | 2/1991 | Kostorz | |
| 5,000,823 A | 3/1991 | Lindahl | |
| 5,010,924 A | 4/1991 | Jenn | |
| 5,012,536 A | 5/1991 | Rivera | |
| 5,025,983 A | 6/1991 | Akita | |
| 5,031,256 A | 7/1991 | Mikiya | |
| 5,032,015 A | 7/1991 | Christianson | |
| 5,035,262 A * | 7/1991 | Schweikert | B01F 15/0429 137/607 |
| 5,054,471 A | 10/1991 | Ohlson | |
| 5,058,220 A | 10/1991 | Mikiya | |
| 5,064,699 A | 11/1991 | Havens et al. | |
| 5,065,942 A | 11/1991 | Shannon | |
| 5,070,549 A | 12/1991 | Campe | |
| 5,111,538 A | 5/1992 | Chapman | |
| 5,111,740 A | 5/1992 | Klein | |
| 5,125,433 A | 6/1992 | Demoss et al. | |
| 5,148,551 A | 9/1992 | Humpert et al. | |
| 5,165,456 A | 11/1992 | Woolman | |
| 5,173,327 A | 12/1992 | Sandhu et al. | |
| 5,176,177 A | 1/1993 | Rupp | |
| 5,185,893 A | 2/1993 | Lin | |
| 5,206,928 A | 4/1993 | Sporri | |
| 5,206,963 A | 5/1993 | Wiens | |
| 5,233,914 A | 8/1993 | English | |
| 5,239,712 A | 8/1993 | Kinder | |
| 5,241,976 A | 9/1993 | Ikawa | |
| 5,261,127 A | 11/1993 | Tsipov | |

(56) References Cited

U.S. PATENT DOCUMENTS

| | | |
|---|---|---|
| 5,261,130 A | 11/1993 | Kendall |
| 5,265,287 A | 11/1993 | Henkin et al. |
| 5,273,208 A | 12/1993 | Herrick |
| 5,274,860 A | 1/1994 | Avila |
| 5,293,654 A | 3/1994 | Castwall et al. |
| 5,299,329 A | 4/1994 | Constantini |
| 5,311,621 A | 5/1994 | Tung |
| 5,329,650 A | 7/1994 | Zaccai et al. |
| 5,353,448 A | 10/1994 | Lee |
| 5,359,757 A | 11/1994 | Yamakita |
| 5,361,789 A | 11/1994 | Yoshida et al. |
| 5,365,620 A | 11/1994 | MacLeod |
| 5,372,651 A | 12/1994 | Kodama |
| 5,400,966 A | 3/1995 | Weaver et al. |
| 5,408,709 A | 4/1995 | Lockwood |
| 5,414,879 A | 5/1995 | Hiraishi et al. |
| 5,427,148 A | 6/1995 | Fan |
| 5,431,180 A | 7/1995 | Stenberg |
| RE35,018 E | 8/1995 | Homan |
| 5,437,418 A | 8/1995 | Graef et al. |
| 5,447,686 A | 9/1995 | Seidner |
| 5,452,485 A | 9/1995 | Ross |
| 5,492,149 A | 2/1996 | Loschelder et al. |
| 5,493,739 A | 2/1996 | Bezdek |
| 5,493,790 A | 2/1996 | Brossard |
| 5,494,077 A | 2/1996 | Enoki et al. |
| 5,494,718 A | 2/1996 | Adams et al. |
| 5,495,864 A | 3/1996 | Takagi et al. |
| 5,504,306 A | 4/1996 | Russell et al. |
| 5,505,227 A | 4/1996 | Pubben |
| 5,518,019 A | 5/1996 | Clare |
| 5,555,913 A | 9/1996 | Waidele et al. |
| 5,557,955 A | 9/1996 | Kinsella |
| 5,560,541 A | 10/1996 | Warshawsky et al. |
| 5,584,735 A | 12/1996 | McMath |
| 5,604,633 A | 2/1997 | Christianson |
| 5,608,928 A | 3/1997 | Wang |
| 5,652,976 A | 8/1997 | Hopper |
| 5,660,164 A | 8/1997 | Rodriguez Sanchez |
| 5,729,848 A | 3/1998 | Yamagishi |
| 5,730,167 A | 3/1998 | Enoki et al. |
| 5,735,467 A | 4/1998 | Lee |
| 5,758,828 A | 6/1998 | Takahashi |
| 5,772,119 A | 6/1998 | Someya et al. |
| 5,788,160 A | 8/1998 | Woog |
| 5,791,401 A | 8/1998 | Nobile |
| 5,829,469 A | 11/1998 | Sileno et al. |
| 5,839,135 A | 11/1998 | Kitamura |
| 5,840,126 A | 11/1998 | Yoshida et al. |
| 5,845,345 A | 12/1998 | Ko |
| 5,847,873 A | 12/1998 | Kim |
| 5,860,596 A | 1/1999 | Kolt |
| 5,862,746 A | 1/1999 | Bielfeldt |
| 5,870,782 A | 2/1999 | Kannenberg |
| 5,871,032 A | 2/1999 | Ko |
| 5,878,654 A | 3/1999 | Kobayashi et al. |
| 5,884,694 A | 3/1999 | Tanenbaum |
| 5,900,065 A | 5/1999 | Liehr et al. |
| 5,902,497 A | 5/1999 | Alber et al. |
| 5,914,043 A | 6/1999 | Farley |
| 5,924,146 A | 7/1999 | Ruiz Elosegui |
| 5,935,336 A | 8/1999 | Sandhu et al. |
| 5,953,770 A | 9/1999 | Kitamura |
| 5,960,828 A | 10/1999 | Grohe et al. |
| 5,964,246 A | 10/1999 | Meeker |
| 5,970,534 A | 10/1999 | Breda |
| 5,975,124 A | 11/1999 | Stevens, II |
| 5,978,983 A | 11/1999 | Queen et al. |
| 5,979,775 A | 11/1999 | Raya |
| 5,979,776 A | 11/1999 | Williams |
| 5,983,419 A | 11/1999 | Carroll |
| 5,996,140 A | 12/1999 | Kitamura |
| 6,016,977 A | 1/2000 | Farley |
| 6,021,960 A | 2/2000 | Kehat |
| 6,022,412 A | 2/2000 | Vincenzo et al. |
| 6,029,094 A | 2/2000 | Diffut |
| 6,042,027 A | 3/2000 | Sandvik |
| 6,047,416 A | 4/2000 | Carrier |
| 6,056,875 A | 5/2000 | Farley |
| 6,073,366 A | 6/2000 | Aswad |
| 6,079,061 A | 6/2000 | Fan |
| 6,089,296 A | 7/2000 | Hess et al. |
| 6,089,845 A | 7/2000 | Morgan et al. |
| 6,098,213 A | 8/2000 | Chu |
| 6,101,451 A | 8/2000 | Smith et al. |
| 6,101,642 A | 8/2000 | Auten et al. |
| 6,105,178 A | 8/2000 | Kurisaki et al. |
| 6,108,830 A | 8/2000 | Schmitt |
| 6,110,519 A | 8/2000 | Meyer et al. |
| 6,112,342 A | 9/2000 | Breda |
| 6,119,947 A | 9/2000 | Couture et al. |
| 6,123,094 A | 9/2000 | Breda |
| 6,164,307 A | 12/2000 | Byles |
| 6,185,759 B1 | 2/2001 | Staudenmayer |
| 6,187,374 B1 | 2/2001 | Hardy et al. |
| 6,198,073 B1 | 3/2001 | Gonzalez |
| 6,214,788 B1 | 4/2001 | Velazco et al. |
| 6,223,698 B1 | 5/2001 | Lacaze |
| 6,227,801 B1 | 5/2001 | Liu |
| 6,233,755 B1 | 5/2001 | Shimizu |
| 6,243,891 B1 | 6/2001 | Nickerson et al. |
| 6,250,558 B1 | 6/2001 | Dogre Cuevas |
| 6,253,394 B1 | 7/2001 | Goyette et al. |
| 6,267,134 B1 | 7/2001 | Chen |
| 6,270,023 B1 | 8/2001 | Farley |
| 6,283,447 B1 | 9/2001 | Fleet |
| 6,286,764 B1 | 9/2001 | Garvey et al. |
| 6,293,121 B1 | 9/2001 | Labrador |
| 6,294,186 B1 | 9/2001 | Beerse et al. |
| 6,302,094 B1 | 10/2001 | Wehrly et al. |
| 6,317,717 B1 | 11/2001 | Lindsey et al. |
| 6,322,005 B1 | 11/2001 | Kern et al. |
| 6,362,243 B1 | 3/2002 | Sasabe et al. |
| 6,362,303 B1 | 3/2002 | Byker et al. |
| 6,363,961 B1 | 4/2002 | Wang |
| 6,389,958 B1 | 5/2002 | Ono |
| 6,405,939 B1 | 6/2002 | Mazzenga et al. |
| 6,416,318 B1 | 7/2002 | Lee et al. |
| 6,418,573 B1 | 7/2002 | Masuda |
| 6,425,403 B1 | 7/2002 | Lin Lu et al. |
| 6,438,770 B1 | 8/2002 | Hed et al. |
| 6,467,103 B1 | 10/2002 | Gardenier et al. |
| 6,473,917 B1 | 11/2002 | Mateina |
| 6,481,028 B1 | 11/2002 | Hsia |
| 6,481,029 B1 | 11/2002 | Mateina |
| 6,509,053 B1 | 1/2003 | Hernandez Callejas et al. |
| 6,516,477 B1 | 2/2003 | Storm |
| 6,525,298 B1 | 2/2003 | Hunts |
| 6,537,455 B2 | 3/2003 | Farley |
| 6,619,805 B1 | 9/2003 | Roth |
| 6,627,011 B2 | 9/2003 | Sugawara et al. |
| 6,637,048 B1 | 10/2003 | Lorch et al. |
| 6,640,357 B1 | 11/2003 | Chang |
| 6,643,862 B2 | 11/2003 | Aitken |
| 6,644,333 B2 | 11/2003 | Gloodt |
| 6,681,417 B2 | 1/2004 | Brunelle et al. |
| 6,681,418 B1 | 1/2004 | Bierend et al. |
| 6,691,338 B2 | 2/2004 | Zieger |
| 6,702,942 B1 | 3/2004 | Nield |
| 6,705,534 B1 | 3/2004 | Mueller |
| 6,714,726 B1 | 3/2004 | Mitani et al. |
| 6,770,318 B1 | 8/2004 | Roussell et al. |
| 6,802,424 B2 | 10/2004 | Ouyoung |
| 6,827,004 B2 | 12/2004 | Hammad et al. |
| 6,880,565 B2 | 4/2005 | Ouyoung |
| 6,892,952 B2 | 5/2005 | Chang et al. |
| 6,913,203 B2 | 7/2005 | Delangis |
| 6,925,661 B1 | 8/2005 | Anger |
| 6,978,496 B2 | 12/2005 | Adrian |
| 7,013,504 B2 | 3/2006 | Brunelle et al. |
| 7,036,520 B2 | 5/2006 | Pearson, Jr. |
| 7,097,876 B2 | 8/2006 | Tojo et al. |
| 7,143,961 B1 | 12/2006 | Wu et al. |
| 7,171,761 B1 | 2/2007 | Hunts |

(56) References Cited

U.S. PATENT DOCUMENTS

| | | |
|---|---|---|
| 7,174,579 B1 | 2/2007 | Bauza |
| 7,174,580 B1 | 2/2007 | Papierniak |
| 7,178,543 B2 | 2/2007 | Adams |
| 7,210,493 B1 | 5/2007 | Wang |
| 7,234,318 B2 | 6/2007 | Grisler |
| 7,296,593 B2 | 11/2007 | Matsui et al. |
| 7,299,811 B2 | 11/2007 | Stewart et al. |
| 7,308,724 B2 | 12/2007 | Ho |
| 7,313,934 B2 | 1/2008 | Heo et al. |
| D567,910 S | 4/2008 | Shieh |
| 7,350,246 B1 | 4/2008 | Smith et al. |
| 7,404,418 B1 | 7/2008 | Olatunbosun |
| 7,456,239 B2 | 11/2008 | Theil et al. |
| 7,464,418 B2 | 12/2008 | Seggio et al. |
| 7,485,381 B2 | 2/2009 | Dickman et al. |
| 7,494,244 B1 | 2/2009 | Van Diep et al. |
| 7,508,318 B2 | 3/2009 | Casella et al. |
| 7,520,445 B2 | 4/2009 | Feinleib et al. |
| 7,537,175 B2 | 5/2009 | Miura et al. |
| 7,553,076 B2 | 6/2009 | An |
| 7,569,530 B1 | 8/2009 | Pan et al. |
| 7,575,019 B2 | 8/2009 | Oh |
| 7,578,309 B2 | 8/2009 | Breda |
| 7,579,389 B2 | 8/2009 | Ong |
| 7,617,763 B2 | 11/2009 | Chen et al. |
| 7,644,650 B2 | 1/2010 | Suzuki |
| 7,681,803 B2 | 3/2010 | Knapp |
| D613,382 S | 4/2010 | Hoernig et al. |
| D613,626 S | 4/2010 | Wang |
| D613,627 S | 4/2010 | Wang |
| D614,739 S | 4/2010 | Hoernig et al. |
| D614,740 S | 4/2010 | Hoernig et al. |
| D614,741 S | 4/2010 | Hoernig et al. |
| D614,742 S | 4/2010 | Hoernig et al. |
| D614,743 S | 4/2010 | Hoernig et al. |
| D614,744 S | 4/2010 | Hoernig et al. |
| D614,745 S | 4/2010 | Hoernig et al. |
| D614,746 S | 4/2010 | Hoernig et al. |
| D614,747 S | 4/2010 | Hoernig et al. |
| D614,748 S | 4/2010 | Hoernig et al. |
| D614,749 S | 4/2010 | Hoernig et al. |
| D614,750 S | 4/2010 | Hoernig et al. |
| 7,694,359 B1 | 4/2010 | Hall |
| 7,694,624 B2 | 4/2010 | Chen et al. |
| 7,703,467 B2 | 4/2010 | Stewart et al. |
| D615,172 S | 5/2010 | Hoernig et al. |
| D616,534 S | 5/2010 | Hoernig et al. |
| 7,707,665 B1 | 5/2010 | Hong |
| 7,713,374 B2 | 5/2010 | Kamiyama et al. |
| D618,319 S | 6/2010 | Hoernig et al. |
| D618,320 S | 6/2010 | Hoernig et al. |
| D618,348 S | 6/2010 | Krishna et al. |
| D618,767 S | 6/2010 | Peng |
| D618,768 S | 6/2010 | Hoernig et al. |
| D618,769 S | 6/2010 | Hoernig et al. |
| D618,770 S | 6/2010 | Hoernig et al. |
| D618,771 S | 6/2010 | Hoernig et al. |
| D618,772 S | 6/2010 | Hoernig et al. |
| D618,773 S | 6/2010 | Hoernig et al. |
| 7,744,720 B2 | 6/2010 | Chen et al. |
| D619,685 S | 7/2010 | Hoernig et al. |
| 7,748,227 B2 | 7/2010 | Fukunaga et al. |
| 7,748,649 B2 | 7/2010 | Fujii et al. |
| D621,010 S | 8/2010 | Hoernig et al. |
| D622,364 S | 8/2010 | Hoernig et al. |
| 7,814,586 B1 | 10/2010 | Samuels |
| 7,819,828 B2 | 10/2010 | Anderson |
| D627,571 S | 11/2010 | Hoernig et al. |
| D629,873 S | 12/2010 | Roy |
| 7,849,530 B2 | 12/2010 | Hendricks |
| 7,849,531 B2 | 12/2010 | Rooke et al. |
| 7,854,399 B2 | 12/2010 | Sirkin |
| 7,857,234 B2 | 12/2010 | Daley et al. |
| D633,177 S | 2/2011 | Jeong |
| 7,878,417 B2 | 2/2011 | Brown et al. |
| 7,878,426 B2 | 2/2011 | Denzler |
| 7,887,614 B2 | 2/2011 | Yamazaki et al. |
| 7,887,785 B2 | 2/2011 | Rojas-Wahl et al. |
| 7,900,295 B2 | 3/2011 | Lev |
| 7,905,429 B2 | 3/2011 | Somerfield et al. |
| 7,909,946 B2 | 3/2011 | Oishi |
| 7,934,662 B1 | 5/2011 | Jenkins |
| 7,987,533 B2 | 8/2011 | Phipps et al. |
| 8,006,325 B2 | 8/2011 | Stimpson et al. |
| 8,028,355 B2 | 10/2011 | Reeder et al. |
| 8,046,849 B2 | 11/2011 | Gaiti |
| 8,066,204 B2 | 11/2011 | Petrovic et al. |
| 8,070,072 B2 | 12/2011 | Lin |
| 8,072,575 B2 | 12/2011 | Van Empel et al. |
| 8,104,532 B2 | 1/2012 | Cardone |
| 8,109,288 B2 | 2/2012 | Nagaoka et al. |
| 8,109,292 B2 | 2/2012 | Bolgar et al. |
| 8,132,778 B2 | 3/2012 | Connors |
| 8,156,579 B2 | 4/2012 | Renfrew |
| 8,171,843 B1 | 5/2012 | Heffington |
| 8,185,246 B2 | 5/2012 | Josserand et al. |
| 8,196,988 B1 | 6/2012 | Malleck |
| 8,209,796 B2 | 7/2012 | Eveleigh et al. |
| 8,220,480 B2 | 7/2012 | Assenmacher et al. |
| 8,225,434 B2 | 7/2012 | Grohe |
| D665,883 S | 8/2012 | Flowers et al. |
| 8,242,289 B2 | 8/2012 | Oertling et al. |
| 8,268,168 B2 | 9/2012 | Mang |
| 8,333,361 B2 | 12/2012 | McTargett |
| 8,337,751 B2 | 12/2012 | Stewart et al. |
| 8,349,780 B2 | 1/2013 | Baker et al. |
| 8,375,481 B1 | 2/2013 | Gibbins |
| 8,375,990 B2 | 2/2013 | Veros |
| 8,376,241 B2 | 2/2013 | Green et al. |
| 8,387,661 B2 | 3/2013 | Nelson |
| 8,393,020 B2 | 3/2013 | Grant |
| 8,869,835 B1 * | 10/2014 | Sapp ..................... F23K 5/007 137/637 |

* cited by examiner

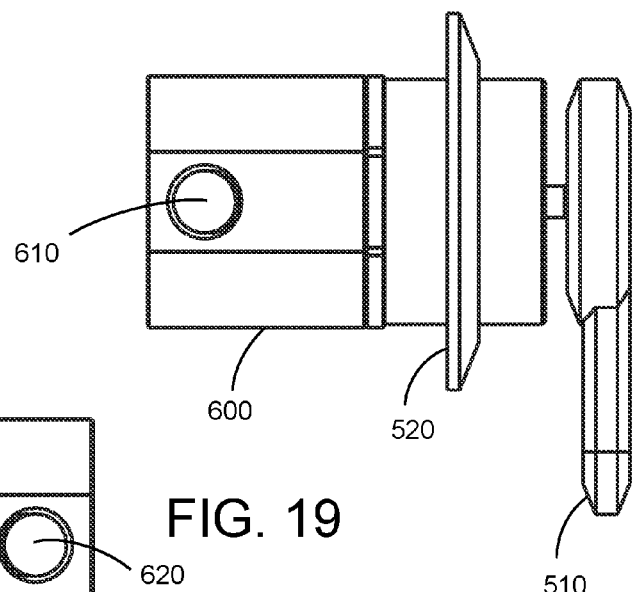
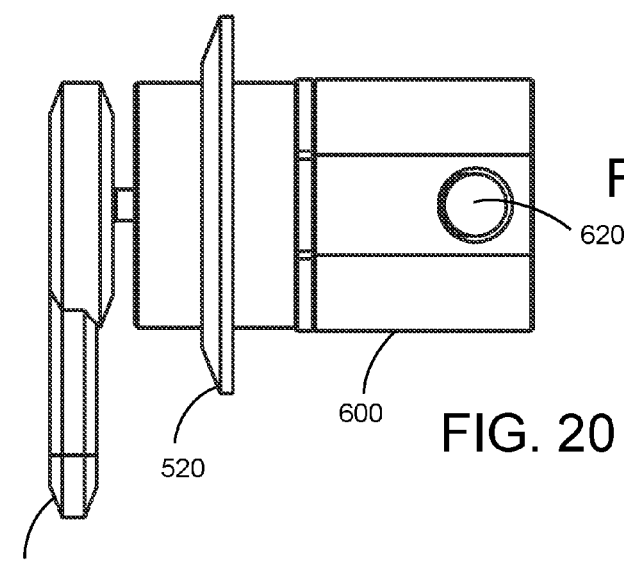
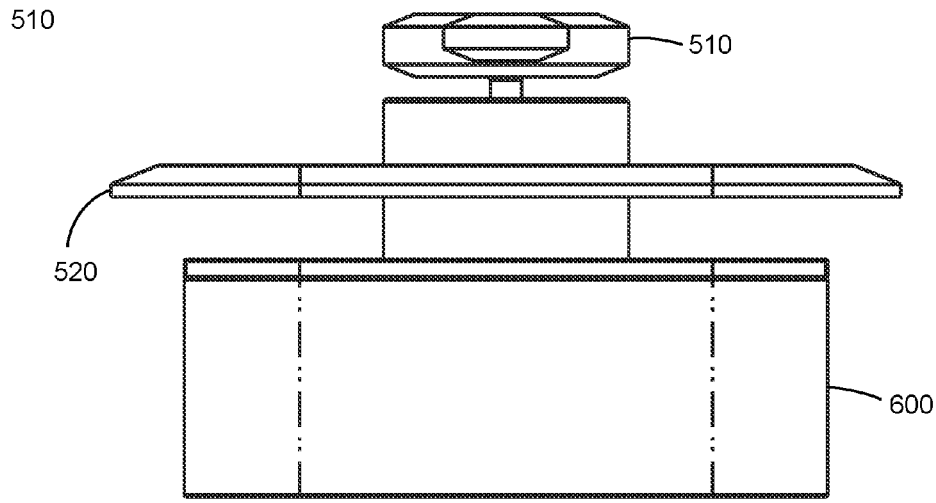
FIG. 19
FIG. 20
FIG. 21

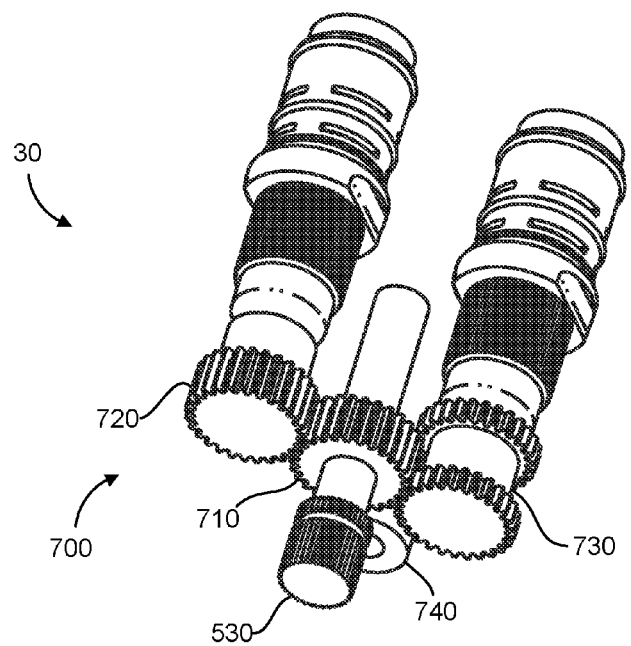
FIG. 38
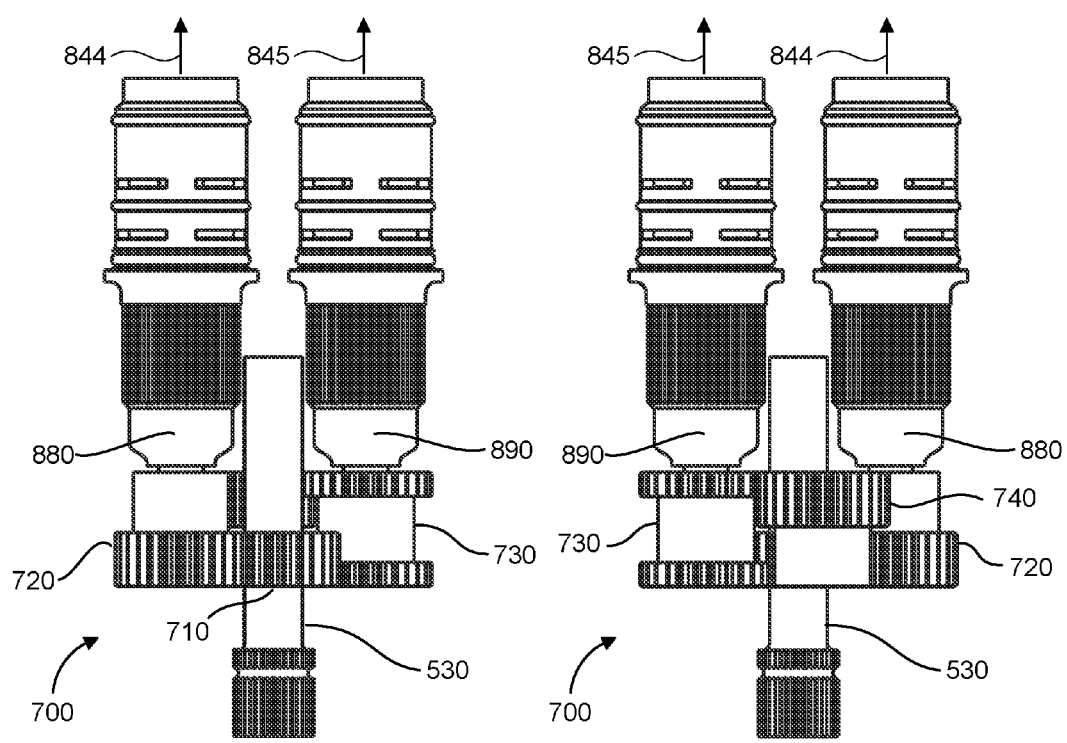
FIG. 39
FIG. 40

MULTIPLE PROPORTION DELIVERY SYSTEMS AND METHODS

CROSS-REFERENCE TO RELATED PATENT APPLICATIONS

The present application is a U.S. National Phase of International Patent Application No. PCT/US2013/051738, filed Jul. 23, 2013, which claims the benefit of and priority to U.S. Provisional Patent Application No. 61/674,777, filed Jul. 23, 2012, titled, "Multiple Proportion Delivery Systems", each of which is incorporated by reference in its entirety.

BACKGROUND

The present disclosure relates to providing fluids to a user and providing the user with a mechanism to control fluid flow. The present disclosure generally relates to a fluid mixing mechanism that allows a user to control the proportions of at least two fluids having different temperatures, compositions, or so on. The present disclosure also relates to allowing the user to control of delivering at least two different fluid proportions. In other words, the systems and methods deliver a mixed fluid proportion flow and two distinct flows at a deviation from the mixed fluid proportion.

Fluids and gases are often delivered through the control of a valve. Fluids of different properties, for example water of different temperatures, are often mixed within a valve for sanitary purposes such as bathing and cleaning, and are delivered for use to basins, bathtubs, and shower enclosures through a spigot or showerhead.

The mechanical valves may include one or more valves, such as gate valves, ball valves, butterfly valves, etc., that control an aperture that regulates the amount of fluid flow. At least two of the valves may be used to control the composition and proportions of two different fluids. The fluids may then be combined in a subsequent chamber for delivery. The aperture control for each fluid may be coordinated through a common handle, as is used in single-handle faucets.

Mechanical valves may also include pressure-balancing or thermostatic valves. Such valves allow for coordinated control of two fluids through one control handle, additionally regulating the flow of each fluid through changes in pressure or temperature of the supply fluid, respectively. Such valves provide autonomous control of the delivery of fluid to help eliminate fluctuations in delivery temperature caused by changes within the supply lines. Each water supply is delivered into a common chamber to mix the water to the desired proportions.

Electronic valves are similar to gate valves. Common electronic solenoid valves use an electromagnet to turn the flow of water on or off. Control of the proportions of the water supply is limited; however, pulse width modulation may be employed with the solenoid valves to achieve a partially open position of the valves. Other electronic valves use a stepper motor attached to a gate valve, pressure balancing valve, or thermostatic valve, which allow control of the proportions of the water supply. The water is delivered to a common chamber to mix the water to the desired proportions.

All gas and fluid valves may include a control element. Mechanical valves include one or two handles allowing the user to select the proportion of each fluid and the water temperature he or she desires. Electronic valves are controlled through an electronic user interface with buttons or switches. The user is able to control the proportion of each water supply individually, with two-handled faucets, or in synchronization, with one-handle and electronic faucets.

All of the described valves can be used individually or in a pairing to control the flow of two water supplies of unequal temperature, which are often mixed within a subsequent and common chamber to be delivered through a spigot or shower head. The two different water supplies are quickly homogenized within the valve and delivered at a mixed water temperature.

SUMMARY

Embodiments include valves that provide coordinated control over the desired proportion of the flow of a fluid. Embodiments include a valve that delivers a selected fluid proportion with the ability to control the delivery of at least two distinct flows at a deviation from the selected proportion.

One embodiment relates to a valve that includes a control spline positioned to move from a first position to a second position and the control spline being axially rotatable in both the first position and second position. The valve also includes a portion of a first fluid mixing cartridge rotatably coupled to at least one portion of the control spline when the control spline is in the second position. The valve includes a portion of a second fluid mixing cartridge rotatably coupled to the at least one portion of the control spline when the control spline is in the second position and the first fluid mixing cartridge is configured to rotate in a different direction than the second fluid mixing cartridge when the control spline is in the second position.

Another embodiment relates to a valve that includes a control spline positioned to move from a second position to a first position and the control spline being axially rotatable in both the first position and second position and a portion of a first fluid mixing cartridge rotatably coupled to at least one portion of the control spline when the control spline is in the first position. The valve includes a portion of a second fluid mixing cartridge rotatably coupled to the at least one portion of the control spline when the control spline is in the first position and the first fluid mixing cartridge is configured to rotate in a same direction as the second fluid mixing cartridge when the control spline is in the first position.

BRIEF DESCRIPTION OF THE FIGURES

The disclosure will become more fully understood from the following detailed description, taken in conjunction with the accompanying figures, wherein like reference numerals refer to like elements, in which:

FIG. 19 is a left view of the mixing valve of the multiple proportion delivery systems;

FIG. 20 is a right view of the mixing valve of the multiple proportion delivery systems;

FIG. 21 is a bottom view of the mixing valve of the multiple proportion delivery systems;

FIG. 38 illustrates a trimetric view of a coordinated mixing mechanism of the mixing valve;

FIG. 39 illustrates a top view of the coordinated mixing mechanism;

FIG. 40 illustrates a bottom view of the coordinated mixing mechanism;

DETAILED DESCRIPTION OF THE EXEMPLARY EMBODIMENTS

Figure 1A:
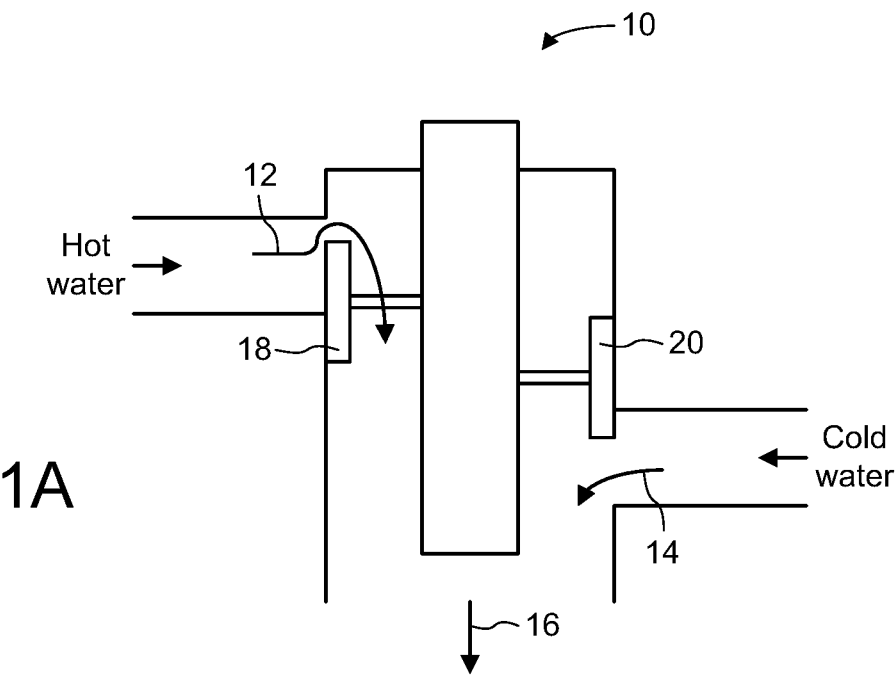
FIG. 1A is a diagram of the fluid control system of a fluid delivery system of the present disclosure.

Referring generally to the figures, systems and methods are described for controlling the delivery of a first flow of fluid and two distinct flows of fluids at a deviation from the first flow of fluid. A fluid delivery system and control valve thereof is described that allows for mixing of at least two different gases or fluids utilizing a coordinated control approach and isolated delivery channels. This produces a delivery of a mixed fluid to a desired proportion (e.g., mixed temperature water at a desired rate out of the spout) and the delivery of two distinct flows at a deviation from the desired proportion (e.g., hot and cold water output at a different rate out of the spout). The transport of the two distinct flows remains isolated through the fluid delivery system to the egress ports.

The fluid delivery system includes a fluid control portion and a delivery channel portion. The fluid control portion may include coordinated control elements and deviation control elements configured to control the output of mixed fluids and two distinct fluids at a deviation from the mixed fluid, respectively. The delivery channel portion may include two or more channels for the separate delivery of each fluid. The separate fluid flows remain separate from one other through final delivery (e.g., through a showerhead). For example, within a showerhead, multiple channels are used to separate the separate flows into individual ports or channels.

The fluid control portion of the fluid delivery system can be realized via mechanical or electronic methods. At least two aperture-controlling elements are required for coordinated control of the fluid proportion, and at least two additional aperture-controlling elements are required for deviation control of the other flows. Thus, at least four aperture-controlling elements are required for the fluid control system of the fluid delivery system.

The mechanism within a valve used for the control of an aperture is commonly referred to as the valve cartridge. The valve may include a valve body configured to house the valve cartridge. The valve cartridge may include a valve stem configured to control adjustment of the valve.

The present disclosure herein describes the use of coordinated control valves in the fluid control system. In other embodiments, it may be possible to use standard gate valves to control the flow of a single fluid.

In single-handle faucets, coordinated control of the mixed fluid may be accomplished through a mixing valve cartridge. The mixing valve cartridge includes one element including at least two openings or ports in fixed spatial relation to each other, and a second element with at least one opening or port. As the movable element (e.g., the faucet handle) is moved by a user (e.g., by pushing, pulling, or rotating the handle), the water delivery temperature desired by the user changes. As one element of the mixing valve cartridge is moved in relation to the other element, an aperture is created between the openings of each element, which increases the cross sectional area of one port while simultaneously decreasing the cross sectional area of the other port. An increase in cross sectional area corresponds to an increase in fluid flow, and a decrease in cross sectional area corresponds to a decrease in fluid flow. The increase or decrease of each aperture changes the proportions of each fluid flowing into the common chamber. Changing the aperture allows the user to control the temperature of the fluid being delivered by the user operating the movable element.

For example, in FIG. 1A, coordinated control of a mixed fluid is illustrated. In the valve cartridge 10, hot water flow 12 and cold water flow 14 are mixed together to create a mixed water flow 16. The system includes two elements 18, 20 configured to control the amount of fluid flowing through the system. Element 18 is shown mostly blocking the path of flow 12, and element 20 is shown mostly permitting flow 14 in the system. This may result in a mixed water flow 16 that is colder than the hot water. When a user operates the handle or other movable element to increase or decrease the temperature of the water, elements 18, 20 may move in relation to one another.

Figure 1B:
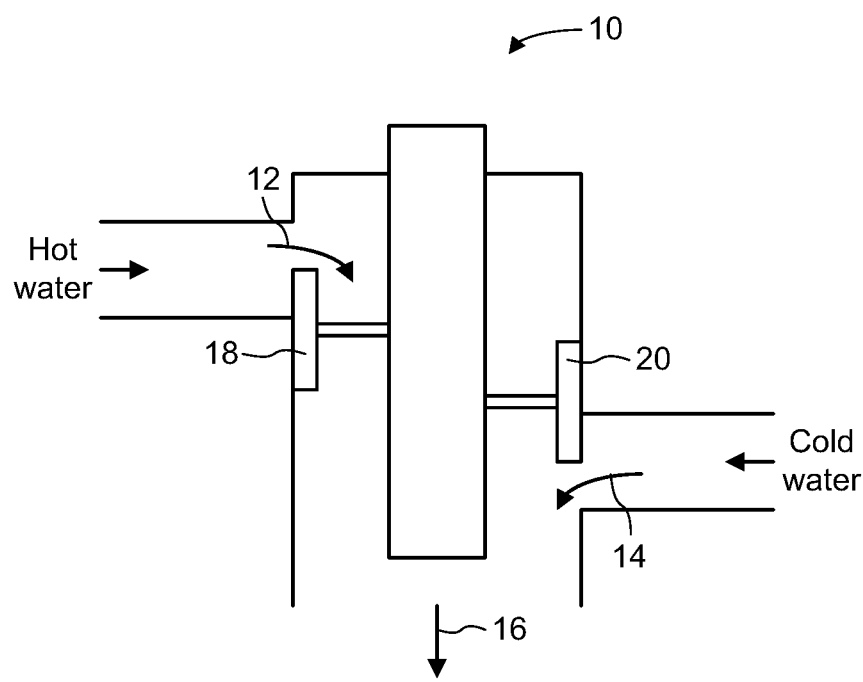
FIG. 1B is the fluid control system of FIG. 1A adjusted to delivery hotter fluids than the system in FIG. 1A.

In FIG. 1B the valve cartridge 10, elements 18, 20 are shown permitting approximately the same amount of hot water flow 12 and cold water flow 14. As shown in FIGS. 1A and 1B, the elements 18 and 20 are connected to a central piston and both elements move up or down based on the movement of the central piston.

Figure 2:
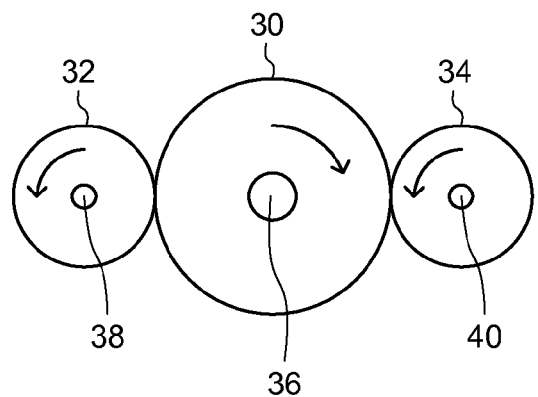
FIG. 2 illustrates an implementation of a coordinated control element of the fluid control system.
Figure 3:
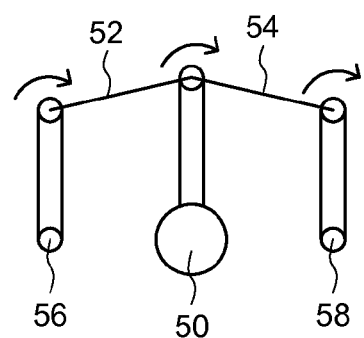
FIG. 3 illustrates an implementation of a coordinated control element of the fluid control system.

By combining two mixing valve cartridges of any valve type into one valve body, it is possible to coordinate the control and delivery of a desired proportion in two distinct flows. Referring generally to FIGS. 2-4, the coordinated control may be implemented in various ways (e.g., mechanically geared, linked, axially aligned, electronic, etc.). Many such solutions may be possible for those skilled in the art.

Figure 5:
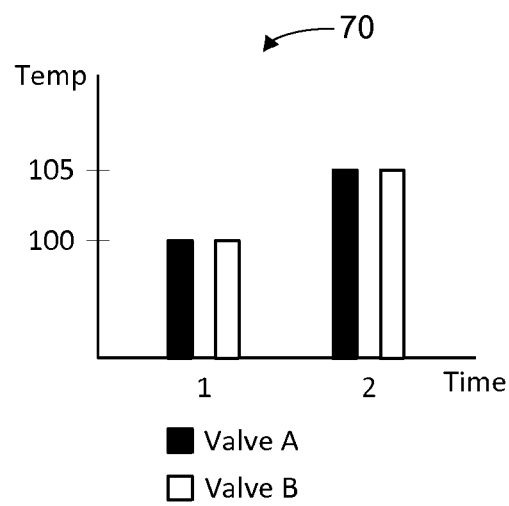
FIG. 5 is a graph illustrating the result of coordinated control in the fluid control system.

In FIG. 2, a mechanical solution for coordinated control is illustrated. In a mechanical solution, two single-handle cartridges (e.g., two mixing valve cartridges serving two different movable elements) are in mechanical communication with one another. The mechanical communication is achieved with a gear 30 and pinions 32, 34. Gear 30 may be a common gear such as a spur gear or other types of gears that enable proportional movement. Gear 30 is in a fixed relation to a control handle (e.g., spline 36). Gear 30 interfaces with identical pinions 32, 34 on two valve cartridge stems connected to splines 38, 40. As the user changes the location of the handle or other movable element, gear 30 on spline 36 changes the position of pinions 32, 34. In this movement, both valve cartridges are adjusted at the same rate, modifying the proportions of each fluid flow at the same rate, providing an identical change. For example, referring to graph 70 of FIG. 5, assume the mixed temperature of valve cartridge A and valve cartridge B are both 100 degrees Fahrenheit. When the user operates the handle, a change in position of gear 30 may change the mixed temperature of both valve cartridge A and valve cartridge B to 105 degrees Fahrenheit at the same rate.

In FIG. 3, another mechanical solution for coordinated control is illustrated. For two single-handle cartridges, the mechanical communication may be achieved with a lever on control handle spline 50 connected with linkages 52, 54 to levers on each of the valve cartridge splines 56, 58. A change in handle position is transferred to a change in each cartridge's position through linkages 52, 54 connected to control handle spline 50.

In FIGS. 4A-D, another embodiment of deviation control is illustrated, in which the control is achieved axially. The benefit of such an arrangement is that both the proportion control and the deviation control may be incorporated into a single valve cartridge, which may simplify manufacturing and reduce the unit costs of the valve.

Aperture controlling elements 930, 931 plungers are shown arranged on a common carriage 970. As the user adjusts a control handle connected to spline 960, carriage 970 is moved axially relative to spline 950. Therefore, temperature of the delivery fluid is adjusted in the same proportion from two separate egress ports. Another handle connected to spline 950 in axial alignment with carriage 970 adjusts the position of two separate carriages in opposite directions. Therefore, deviation control is achieved. Both of these position changes may be achieved with common mechanical means, such as worm gears or spur gears.

In an alternate embodiment, coordinated control is achieved within a single coaxial mixing valve cartridge. In the embodiment, four aperture controlling elements are aligned axially into one valve cartridge. As the handle position is changed, two apertures controlling one fluid stream are opened while two apertures controlling another fluid stream are closed. This may be achieved with a worm gear. The egress of the mixed fluid for each two-fluid combination remains isolated in channels through delivery. The four aperture controlling elements may be plungers moving axially along the cartridge, or gates moving rotatably on a plane perpendicular to the cartridge axis. FIGS. 4A-D describes a plunger embodiment.

In another embodiment, four aperture controlling elements may be aligned axially into one valve stem. As the handle position is changed, two apertures controlling one fluid stream are opened while two apertures controlling another fluid stream are closed. This may be achieved with a worm gear or other types of gears. The egress of the mixed fluid for each two-fluid combination remains isolated in channels through delivery.

In some embodiments, coordinated control is achieved with a coaxial mixing valve cartridge. Referring to FIGS. 4A-D, the cartridge 900 includes control member 950 and control member 960. Control members 950 and 960 may be interlinked though a common carriage 970 via ring-and-groove element 980. Control member 950 is allowed to rotate axially in relation to 970. The planar location perpendicular to the common axes of 950 and 970 of control members 950 and 970 are fixed in relation to each other. Control member 950 is fixed in a common plane to the valve body while control member 960 is allowed to travel axially. Alternatively, control member 960 may be fixed in a common plane to the valve body while control member 950 is allowed to travel axially. Control members 950 and 960 may be in fixed relation to individual control handles located coaxially, or they may be connected through a push-pull gearing arrangement to a single control handle.

Control member 960 is connected to common carriage 970 through worm gear 962. By movably rotating the control handle connected to control member 960 either directly or through mechanical means such as an attached handle or through a gearing arrangement, common carriage 970 is moved through the action of the worm gear 962. The common carriage 970 is connected to plungers 960 and 931 through worm gears 932 and 933. Since control element 950 does not turn axially in this case, plungers 930 and 931 move an equal amount of distance. Such a movement would close port 934 and port 935 while opening port 937 and port 938. Port 934 and port 935 are supplied a fluid 932 through a common channel. Ports 937 and 938 are supplied a different fluid 936 through a common channel. With the equal movement of the plungers a movement identical control is achieved such that the two exit mixture are the same.

Figure 4A:
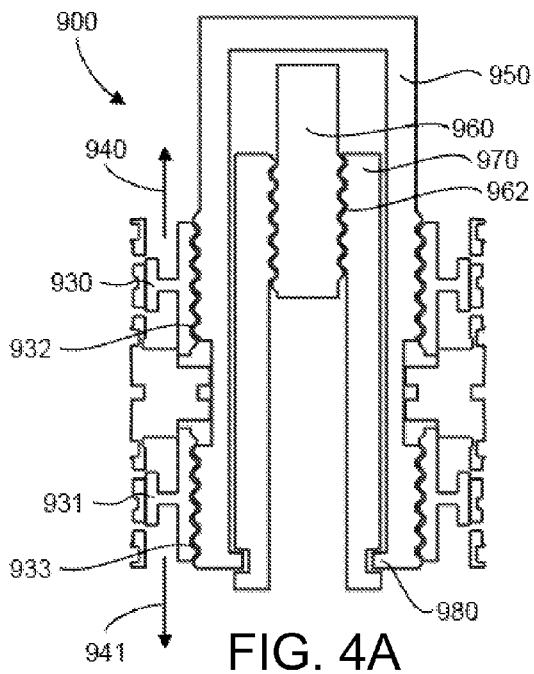
FIGS. 4A-4D illustrate various implementations of a coordinated control element of the fluid control system.

FIG. 4A illustrates a mixing valve 900 that is capable of adjusting the two mixtures similarly and differently. Mixing valve 900 includes a spline 960 that has an outer circumference that has worm gear 962. The worm gear 962 operably connected to carrier 970 such that the operation of the worm gear 962 moves the carrier relative to spline 960 in an axial direction. In some embodiments, the inner volume of the carrier 970 encompasses the spline 960. Carrier 970 includes a notch that houses a portion 980 of control member 950 such that the carrier 970 may move axially relative to the controller member 950.

Control member 950 is connected to plungers 930 and 931 through worm gears 932 and 933. Worm gear 932 is formed in one thread direction while worm gear 933 is formed in an opposing thread direction. Such a configuration allows the plungers 930 and 931 in opposite directions relative to each other.

By movably rotating the control handle connected to control member 950 either directly or through mechanical means such as an attached handle or through a gearing arrangement, plunger 930 moves in an opposing direction to plunger 931. Such a movement would close ports 934 and 937 while opening ports 938 and 935. Ports 934 and 935 are supplied a fluid 932 through a common channel. Ports 937 and 938 are supplied a different fluid 936 through a common channel. With such a movement deviation control is achieved.

Figure 4B:
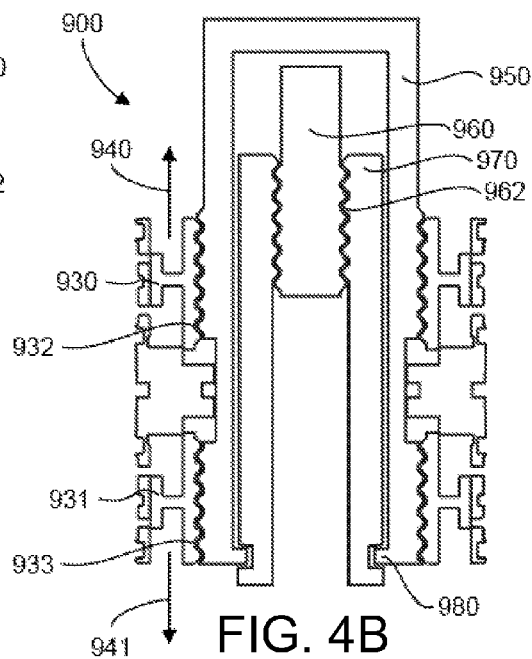
Figure 4C:
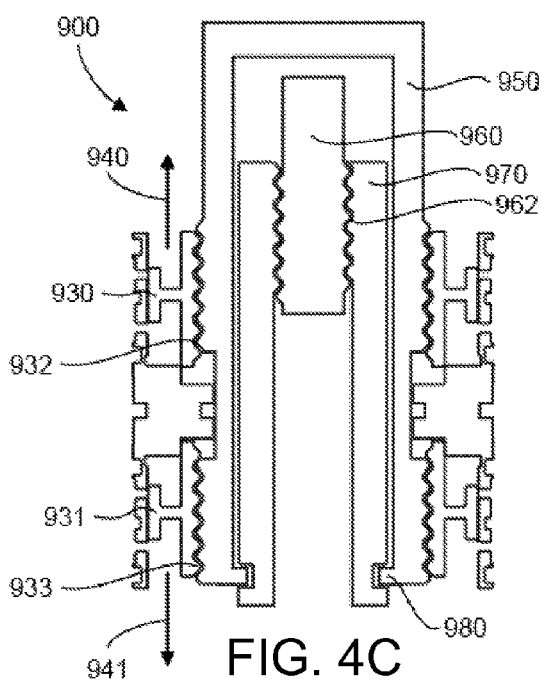
Figure 4D:
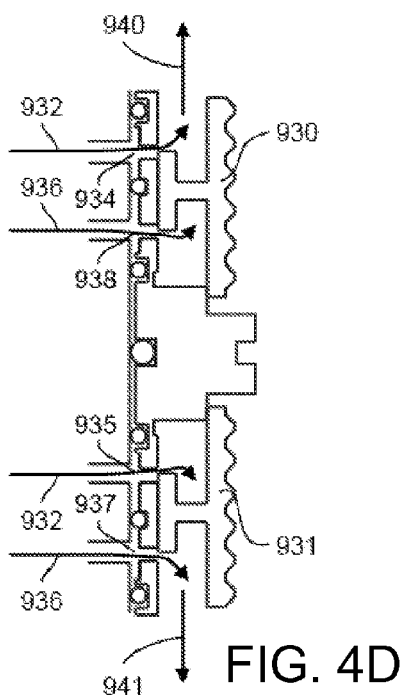

FIG. 4A shows an equal mixture of fluids, thus supplying equal mixtures 940 and 941. By rotating control member 950, plungers 930 and 931 are moved in opposing directions thus supplying deviated mixtures 940 and 941 as can be seen in FIG. 4B. By rotating control member 960, plungers 930 and 931 are moved in equal directions thus modifying mixtures 940 and 941 at the same rate as can be seen in FIG. 4C.

It should be noted that supply 932 can be directed toward inlet port 938, and supply 936 can be directed toward inlet port 934. In such an arrangement, the function of control members 950 and 960 would be reversed.

In another embodiment, the plunger design for a single mixing valve cartridge with four apertures can also be made as a gate design moving rotatably on a plane perpendicular to the cartridge axis.

In an electronic embodiment, the position of the control handle is changed through stepper motors connected to each valve stem. Pulse width modulation may also be employed with solenoid valves to achieve a partially open position for each solenoid valve, and thus coordinated control of two fluid deliveries.

Figure 6:
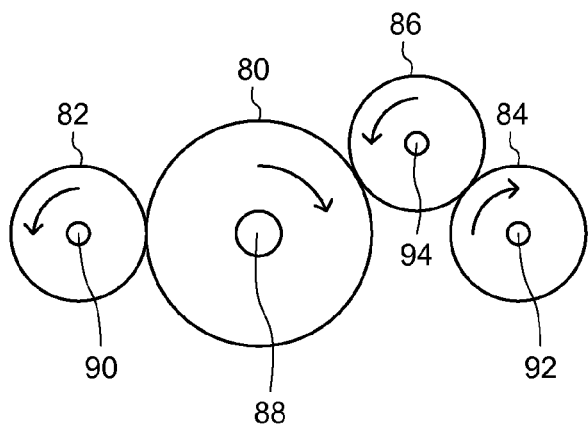
FIG. 6 illustrates an implementation of a deviation control element of the fluid control system.
Figure 7:
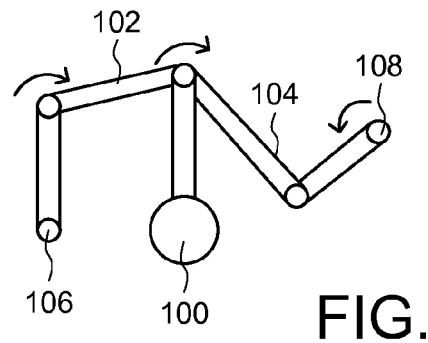
FIG. 7 illustrates an implementation of a deviation control element of the fluid control system.

Referring generally to FIGS. 6-7, methods for deviation control for the fluid control portion of the fluid delivery system are illustrated. By combining previous solutions with a transmission element, it is possible to deviate the delivery of two distinct flows from a desired proportion. The deviation control may be implemented in various ways (e.g., mechanically geared, linked, axially aligned, electronic, etc.). Many such solutions may be possible for those skilled in the art.

In one embodiment, the deviation control is in symmetrical opposition to the desired fluid proportion. As one delivery combination such as temperature is increased, the other combination should be decreased in an equal and opposite amount. For example, as the temperature of one flow of water is increased during deviation control, the temperature of another flow of water is decreased proportionally. However, deviation may be in one direction or in asymmetrical proportion depending on the gearing or programming of the deviation control.

In FIG. 6, a mechanically geared solution for deviation control is illustrated. In a geared solution, an additional pinion (86) is employed compared to the solution of FIG. 2. The pinion 86 rotates on hub 94 and is in mechanical communication with a pinion 84 on one valve cartridge and an intermediate gear 80 connected to another pinion 82 on the other valve cartridge. Gear 80 is in a fixed relation to a control handle (e.g., spline 88). Gear 80 interfaces with pinion 82 and pinion 86 (which may be identical or different from each other). Pinion 86 interfaces with pinion 84. Pinions 82 and 84 are on two valve cartridge stems connected to spline 90 and spline 92. As the user changes the location of the handle or other movable element, gear 80 on spline 88 changes the position of pinions 82, 84. In this movement, both valve cartridges are adjusted at the same but opposite rate, modifying the proportions of each fluid flow at opposite rate, providing a deviation change. This gearing arrangement allows for an equal and opposite adjustment of each valve cartridge. A non-actuating or neutral position is important to allow an equal and opposite adjustment of each valve cartridge. As the user engages the movable element, pinion 86 is engaged and the valve cartridges are adjusted in opposite directions accordingly. If a non-symmetrical adjustment is desired, the gearing ratios may be of unequal values, or may only be connected to one of the valve cartridges.

In other embodiments of a mechanically geared solution, the same handle normally used to adjust the desired proportion (for coordinated control) may be used to engage the deviation control solution as well. This engagement may be biased towards proportion control with a spring, or it can be left to the user to engage or disengage, for instance, by pushing or pulling the handle. In other words, the user may control deviation control and coordinated control with a single movable element, or the single movable element may be biased towards one of the controls.

In FIG. 7, another mechanical solution for deviation control is illustrated. The deviation control may be engaged with one or two handles as described above using levers and linkages. A lever on control handle spline 100 is connected with linkages 102, 104 to levers on each of the valve cartridge splines 106, 108. A clockwise rotation of 100 causes a clockwise rotation of 106 and a counter-clockwise rotation of 108, thus deviating temperature.

Figure 8:
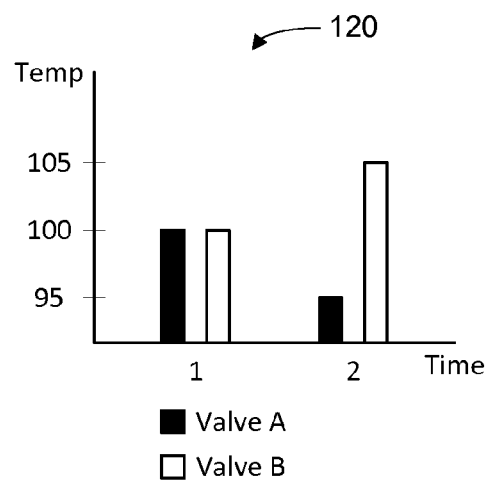
FIG. 8 is a graph illustrating the result of deviation control in the fluid control system.

Referring to graph 120 of FIG. 8, deviation control impact on flow temperatures is illustrated. Assume the mixed temperature of valve cartridge A and valve cartridge B are both 100 degrees Fahrenheit. When the user operates the handle for deviation control, a change in position of gear 80 may change the mixed temperature of valve cartridge A associated with pinion 82 to 95 degrees Fahrenheit, and valve cartridge B associated with pinion 84 to 100 degrees Fahrenheit.

In an electronic embodiment, the control of the four apertures may be achieved electronically. For a two valve cartridge system, one stepper motor is in mechanical communication with each fluid-mixing aperture pair. For a single, axially aligned valve cartridge system, one stepper motor is connected to each carriage pair.

Additionally, electronic control may be achieved with pulse width modulation of four solenoid valves, with two valves connected to a first type of fluid source, two valves connected to a second type of fluid source, two valves connected to a first delivery port, and two valves connected to a second delivery port. Solenoid valves connected to each type of fluid source are also connected to an opposite delivery port to allow for deviation control of the fluid.

Figure 9A:
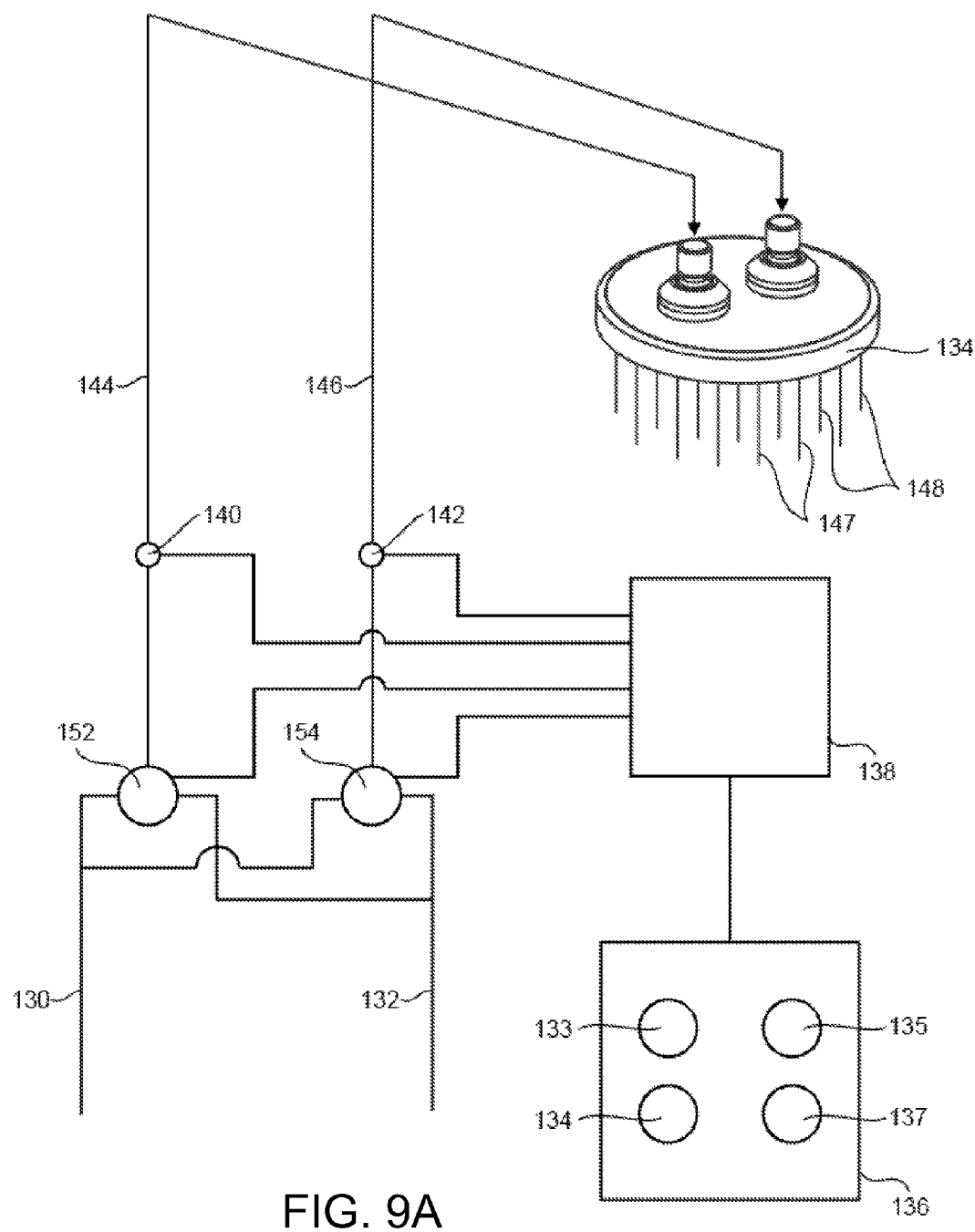
FIGS. 9A-9B are block diagrams of a fluid delivery system in which the fluid control system is electronically controlled.

Referring to FIG. 9A, is a block diagram of an electronically controlled fluid delivery system is shown. The system includes two flows of fluid 130, 132 (e.g., hot and cold water) that is output at a showerhead 134 (or other fluid output element). The system includes a user interface 136 that allows a user to operate the system (e.g., to turn on or off the flow of water, to change the temperature of the flow of water, etc.). For example, user interface 136 may include a touch sensor or other touch-sensitive components that allow a user to control a flow of fluid via, for example, a fingertip press. For example, button 133 may be used to increase the mixed fluid proportion, button 134 to decrease the mixed fluid proportion, 135 to increase the deviation from the mixed fluid proportion, and 137 to decrease the deviation from the mixed fluid proportion. Other interactions with user interface 136 may be possible (e.g., buttons, switches, other sensors such as proximity sensors, motion sensors, etc.).

The system further includes a control system 138 configured to receive and interpret user input at user interface 136. Control system 138 may further be connected to temperature sensors 140, 142 configured to sense the temperature of two different flows of fluid.

Control system 138 may be mechanically or electronically coupled to two stepper motors connected to mixing valves 152, 154 configured to control the output of fluid in showerhead 134. For example, in response to a user input, control system 138 may control the positions of valves 152, 154 to affect the flow of fluids 144, 146.

Figure 9B:
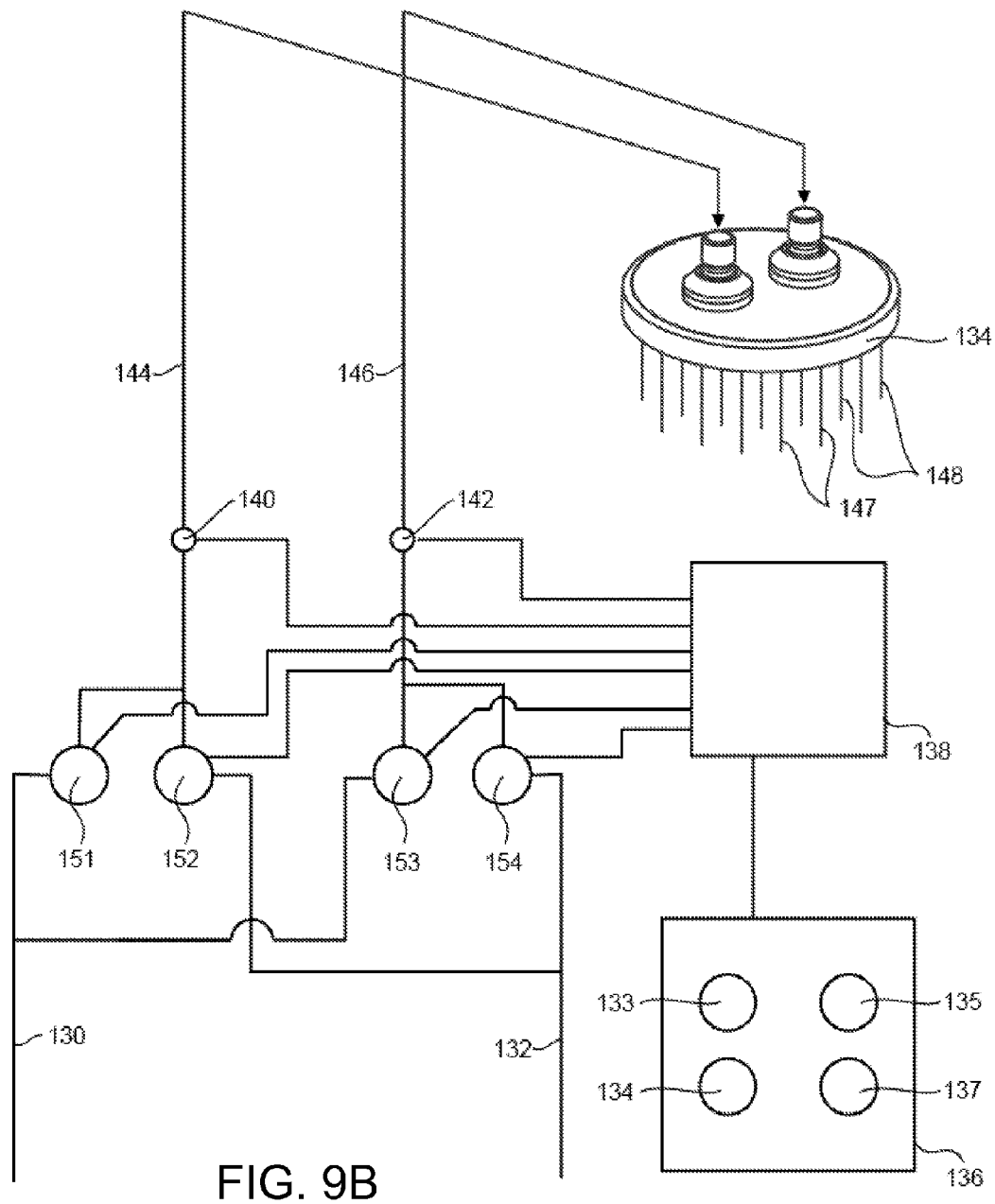

The system of FIG. 9B may be mechanically or electronically coupled to four stepper motors connected to mixing valves 151-154 or magnetic valves 151-154 configured to control separate flows of fluid 144, 146 respectively. Control system 138 is coupled to valve controllers 151-154, which may be adjusted based on user input. Valves 153, 154 are valves configured to mix together the two flows of fluid 130, 132 into flow 146. Valves 151, 152 are valves configured to mix together the two flows of fluid 130, 132 to flow 144. Valves 151-154 may be operated in order to regulate the mixture of the flows of fluid 130, 132, creating two distinct mixed fluid flows 144, 146 each at a desired temperature.

Referring generally to FIGS. 1-9B, the fluid control portion of the fluid delivery system was described. Referring to subsequent figures, a delivery channel portion of the fluid delivery system is described. The delivery channel portion of the fluid delivery system is configured to deliver separate flows of fluid to a showerhead or other output. The delivery channel portion is configured to keep the separate flows of fluid separate.

Delivery channel separation is maintained through delivery of each fluid type. The delivery of each fluid should be in distinct spatial relation to one another so that the effect of the separate fluids is realized. In the case of fluids of a different temperature, such as is used in bathing, the final egress ports or spray channels of the delivery head (e.g., showerhead) are often small apertures. In one embodiment, the small apertures may measure approximately 0.07 inches in diameter and spaced from 0.05 inches to over 0.25 inches apart. There may be as few as 12 to over 200 spray channels in a typical shower head. For optimal effect, delivery ports for one fluid flow may be interspersed with delivery ports for the other fluid flow over an area that allows multiple alternations of each fluid type. The resulting pattern may resemble a checkerboard in the case of two flows, a honeycomb in the case of three flows, or otherwise as described below.

Figure 10:
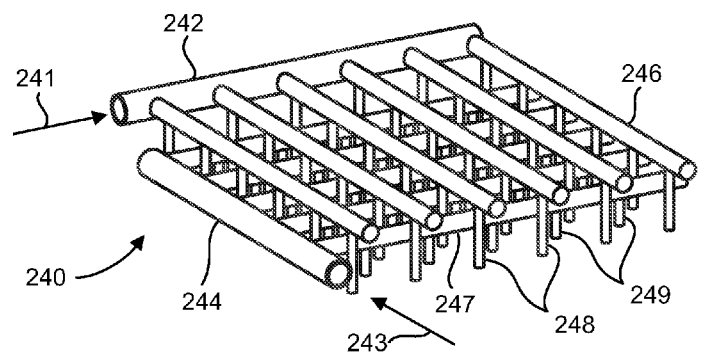
FIG. 10 illustrates a pattern of a delivery channel configuration.
Figure 11:
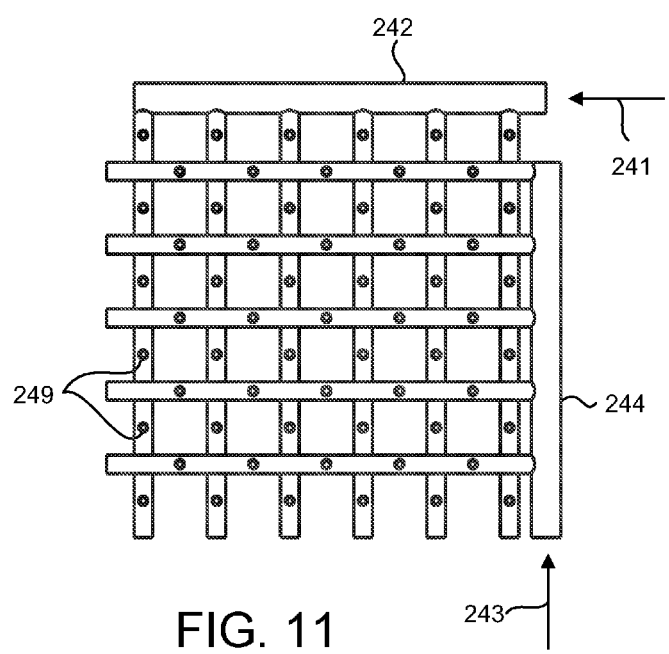
FIG. 11 illustrates a pattern of a delivery channel configuration.
Figure 12:
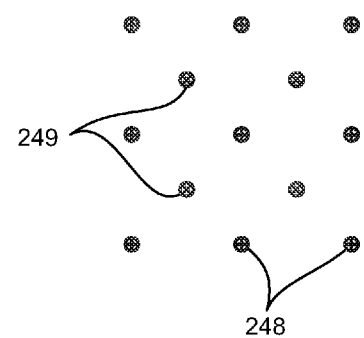
FIG. 12 illustrates a pattern of a delivery channel configuration.

Referring to FIGS. 10-13, a checkerboard pattern 240 for a two-flow delivery system is illustrated, according to exemplary embodiments. As described above, for a two fluid flow system, delivery ports for the two different fluid flows may be interspersed, resulting in a checkerboard pattern on the delivery head of the system. FIGS. 10-11 illustrate a perspective view and bottom view, respectively, of an implementation of checkerboard pattern 240 in a delivery head. Delivery channels 242, 244 are shown as independent delivery channels. Piping may run for both fluids in delivery channels 242, 244 to one or more delivery ports in the delivery head. FIG. 12 illustrates an exemplary checkerboard pattern with a first set and a second set of delivery ports corresponding to delivery channels 242, 244, indicated by an X and +, respectively. In other embodiments, a third fluid flow path may dispense an additional fluid mixture.

In other embodiments, a honeycomb pattern for a three-flow delivery system may be used. As described above, for a three flow system, delivery ports for the three different fluid flows may be interspersed, resulting in a honeycomb pattern on the delivery head of the system.

Channels for two separate fluid flows may be maintained to be separated from each other through final delivery as described above. This is maintained within the delivery head as well. As the two (or more) fluid flows enter the delivery head, multiple channels are used to separate the flows into individual egress ports or spray channels, as generally shown in FIGS. 10-12. The delivery ports may alternate from one delivery type to another for optimal effect. Two methods of creating such an alternation is through a lattice and through concentric channels.

In a lattice, channels are cut in one direction in one plane for one fluid flow, and in another direction in a parallel plane for the other fluid flow. In the case of three fluid flows, an additional set of channels is cut in a third direction in a parallel plane. The channels are linked at one end with a common supply channel, each connected to one of the supply ports. Each channel may then be tapped in a perpendicular direction from the parallel planed, thus creating a checkerboard egress pattern as described above. In other embodiments, the channels may lie in non-planar orientation as long as they maintain separation from one another.

In concentric channels, a series of channels is cut in one plane with a common center point. Fluid may be supplied through ports perpendicular to each channel, and spray channels are created through ports also perpendicular but on the opposite side of the supply ports. If the concentric channels are circular, alternating fluid delivery is made radially from the center. The channels may alternatively be square, in which case a checkerboard pattern may be achieved. In other embodiments, it should be understood that any type of channel shape may be used, such as any polygon, open-ended, or curved shape. Further, the channels may not be concentric so long as the channels maintain separation from one another.

In other embodiments, a concentric channel design for a delivery head may be used. The concentric channel design may include multiple channels, one set of channels for warm water and another set of channels for cold water. The delivery head includes a set of channel inlets for one set of channels, and another set of channel inlets for another set of channels.

In other embodiments, a gear may be used in the fluid control system of the fluid delivery system. The gear may be disengaged or engaged.

Figure 13:
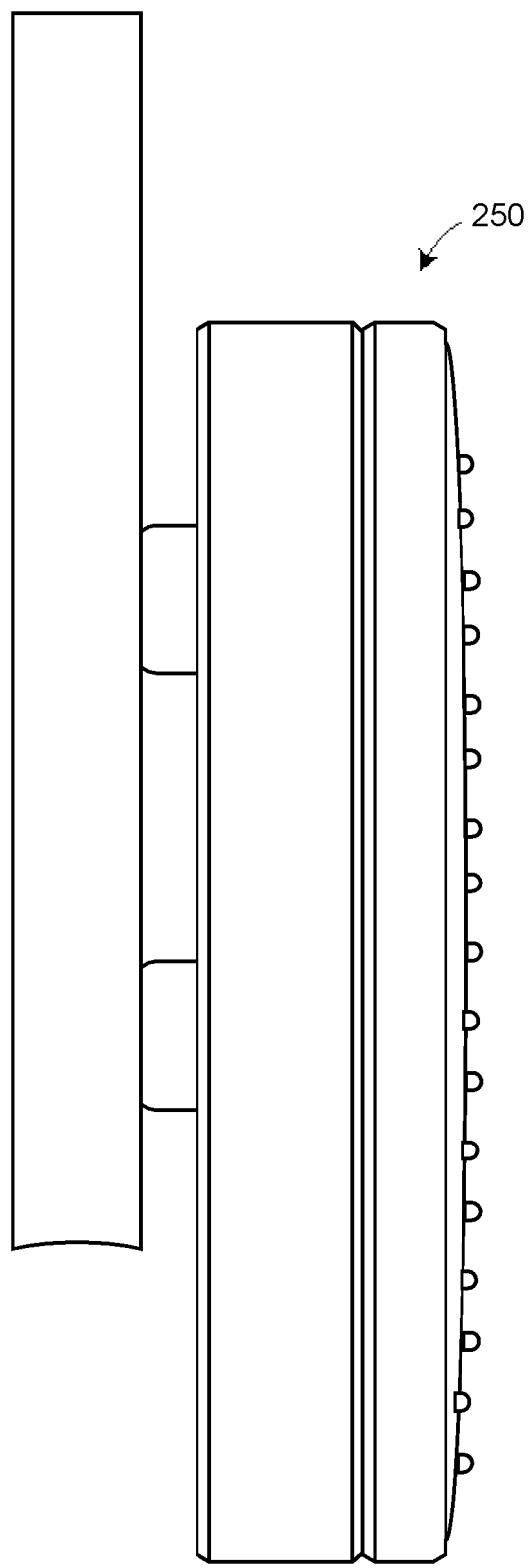
FIG. 13 illustrates a showerhead configuration for use with the fluid control system of the present disclosure.

In one embodiment of the present disclosure, the fluid delivery system described herein may be implemented for a showerhead. Referring to FIG. 13, a showerhead assembly 250 is shown according to various embodiments. The showerhead assembly 250 may be of any shape. For example, generally referring to FIG. 13, the showerhead 250 is circular in shape and includes many protruding openings in which fluid flows through the showerhead as described in the present disclosure.

Figure 14A:
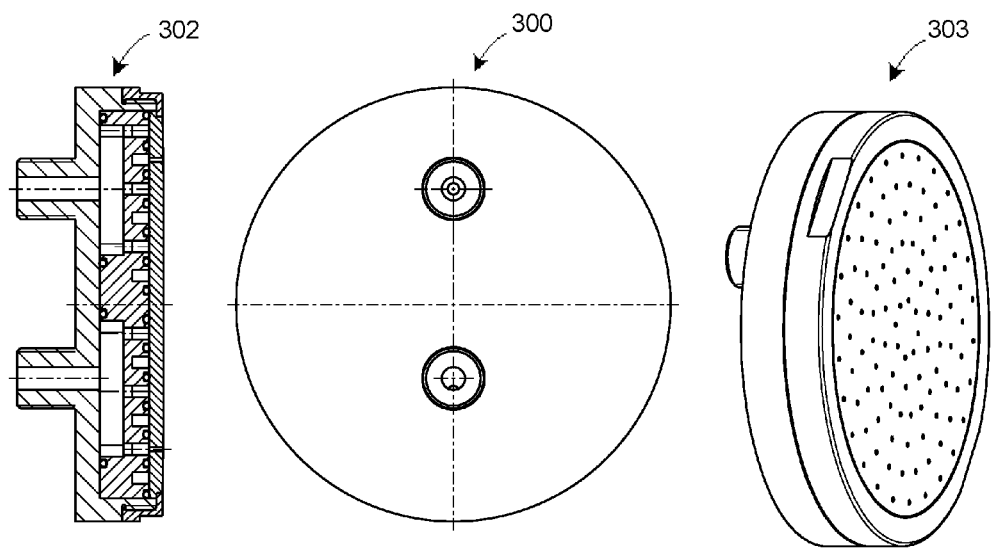
FIGS. 14A-F are views of various components of a showerhead for use with the fluid control system of the present disclosure.
Figure 14B:
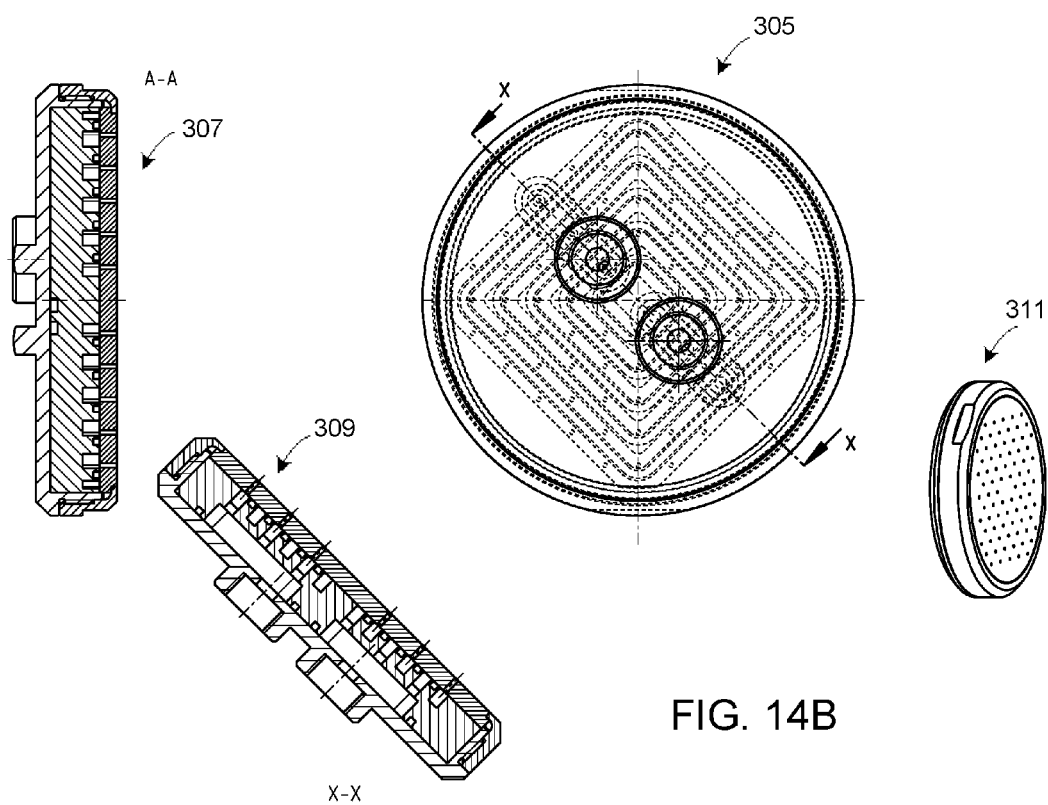
Figure 14C:
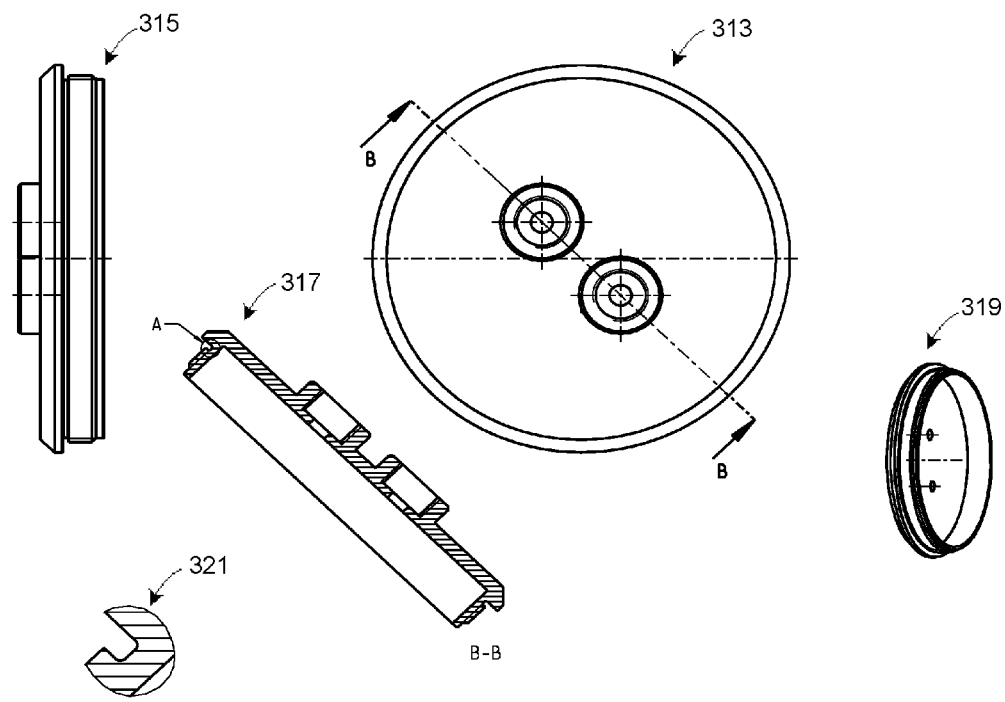
Figure 14D:
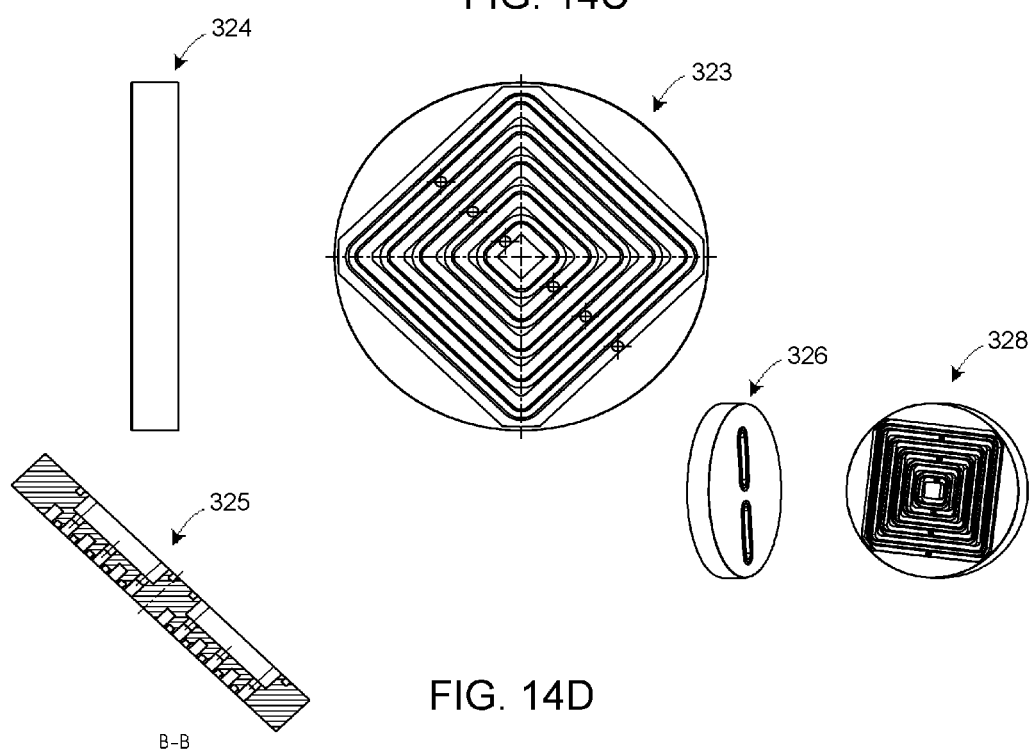
Figure 14E:
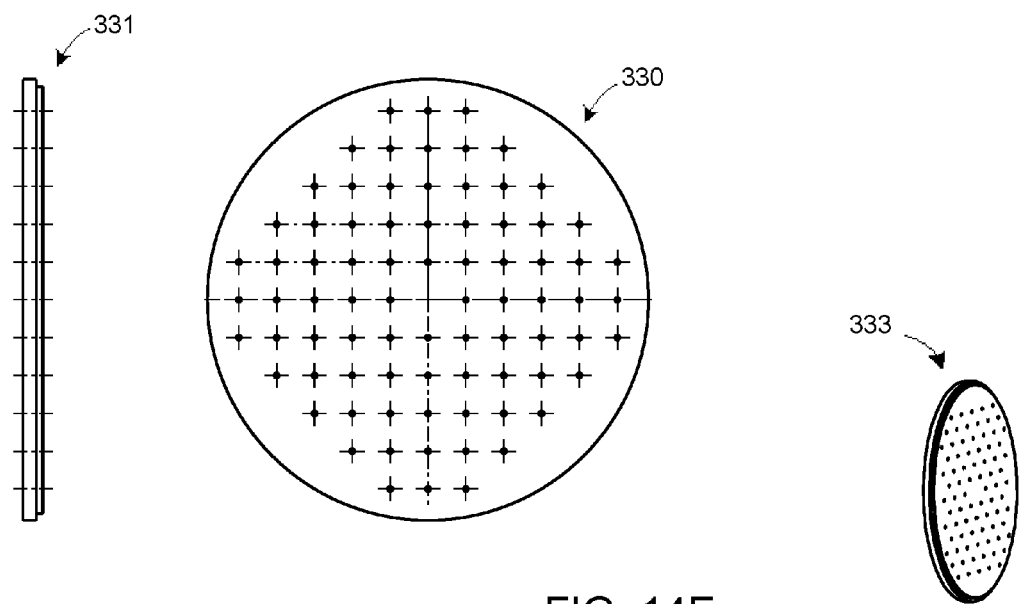
Figure 14F:
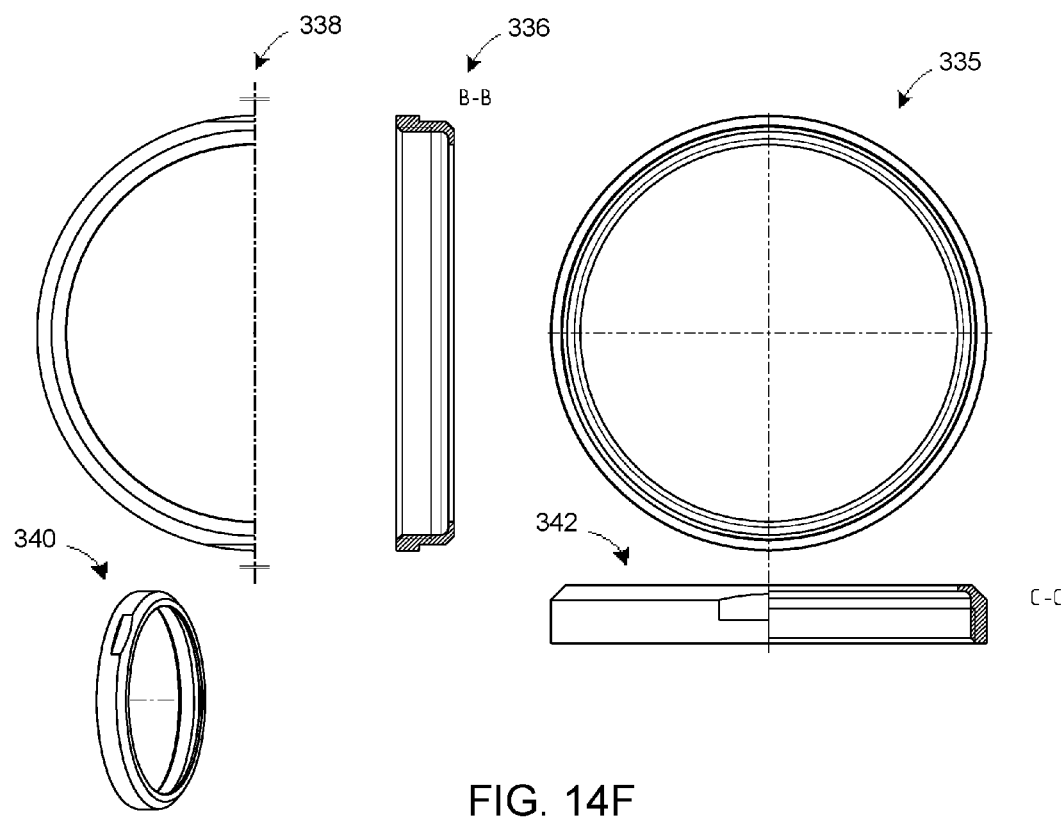

Referring to FIGS. 14A-F, the showerhead assembly is shown in greater detail. FIG. 14A illustrates a back view 300, a cross-sectional view 302 and a prospective view of showerhead cartridges. FIG. 14B illustrates a see through back view 305, a cross-sectional side view 307, cross-sectional side view 309 and a prospective view 311 of a showerhead. Referring more particularly to FIG. 14C, the housing of the showerhead assembly is shown in greater detail including various views such as, 313, 315 317, 319 and 321. Referring more particularly to FIG. 14D, a concentric pattern of the showerhead is shown in greater detail. FIG. 14D shows various views of the concentric square pattern such as front view 323, side view 324, a cut-out view 325, a cover view 326 and a prospective view 328. FIG. 14E illustrates an embodiment of the showerhead including a checkerboard pattern for the flow of water (e.g., the spray face of the showerhead). FIG. 14E illustrates a front view 330, a side view 331 and a prospective view 333. FIG. 14F illustrates the flange of the showerhead in greater detail. FIG. 14F includes a front view 335, a side view 336, a half view 338, a prospective view 340 and a side view 342. The showerhead assembly includes two inlets for two different flows of fluid (e.g., hot water and cold water).

In other embodiments, an alternative channeling configuration of the showerhead may be used, according to an exemplary embodiment. The alternative channeling showerhead may include a hot water chamber and cold water chamber to facilitate the transfer of two separate flows of fluids (e.g., hot water and cold water). Chambers may include multiple delivery ports that are spaced apart across the surface of showerhead.

Figure 15:
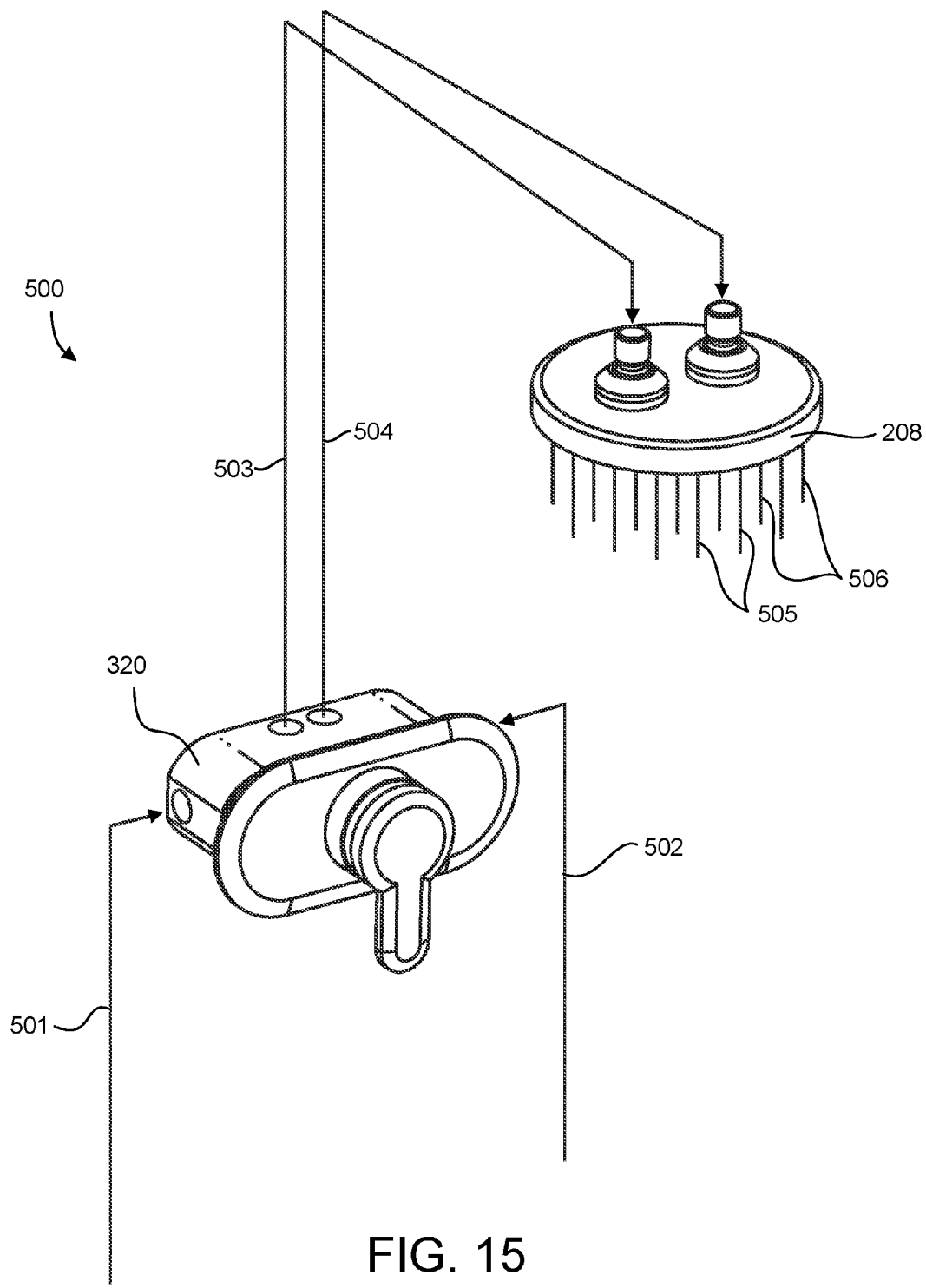
FIG. 15 is a perspective view of a multiple proportion delivery system of the present disclosure.

Referring to FIG. 15, an exemplary preferred embodiment of a multiple proportion delivery system 500 according to a present invention is shown. The multiple proportion delivery system 500 includes a control valve 320 and a delivery device, in this case, a showerhead 208.

The system is supplied two distinct fluid flows (e.g.: hot and cold water) 501 and 502 for mixing in the control valve 320. The control valve mixes the two flows into two proportions selected by the user through control handle 510. Each mixed flow exits the control valve in two distinct fluid flows 503, 504 for delivery to the showerhead 208. The showerhead contains channeling to maintain the separation of the two distinct fluid flows 503, 504 for delivery to the user in two distinct groups of spray streams 505, 506.

Figure 16A:
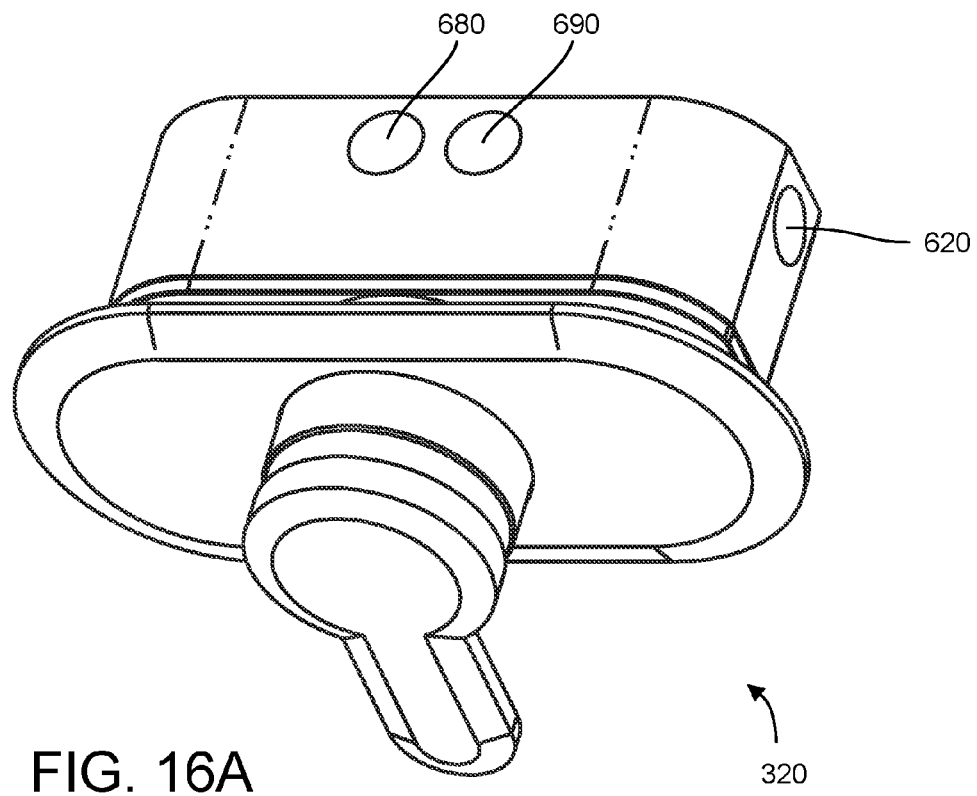
FIGS. 16A-B are trimetric views of the mixing valve of the multiple proportion delivery system from above-right and below-left, respectively.

FIG. 16A is a trimetric view of the mixing valve 320 from above-right showing cold water inlet 620, a left fluid mixture egress port 680 and a right fluid mixture egress port 690.

Figure 16B:
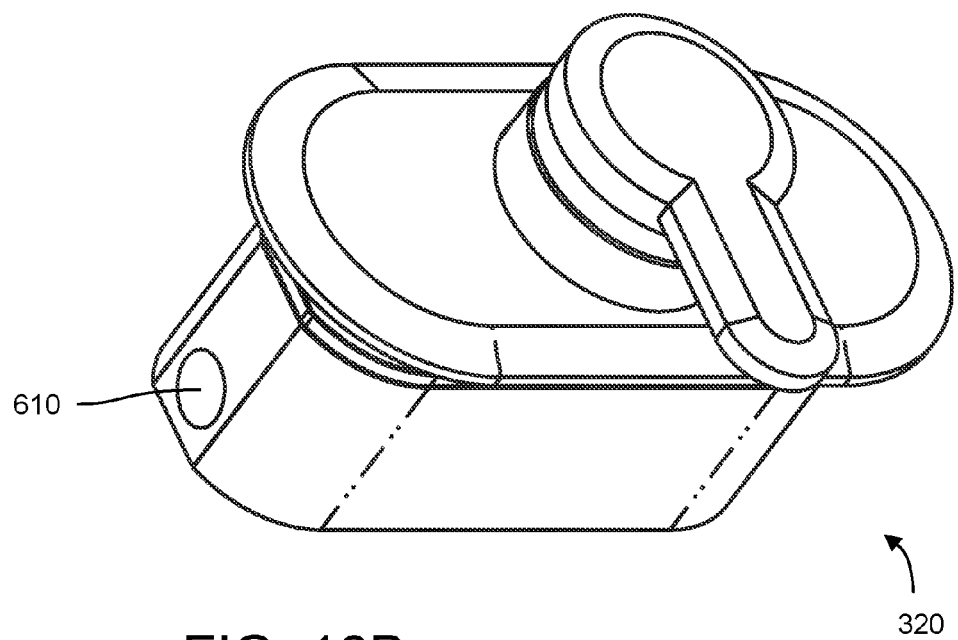

FIG. 16B is a trimetric view of the mixing valve 320 from below-left showing hot water inlet 610.

Figure 17:
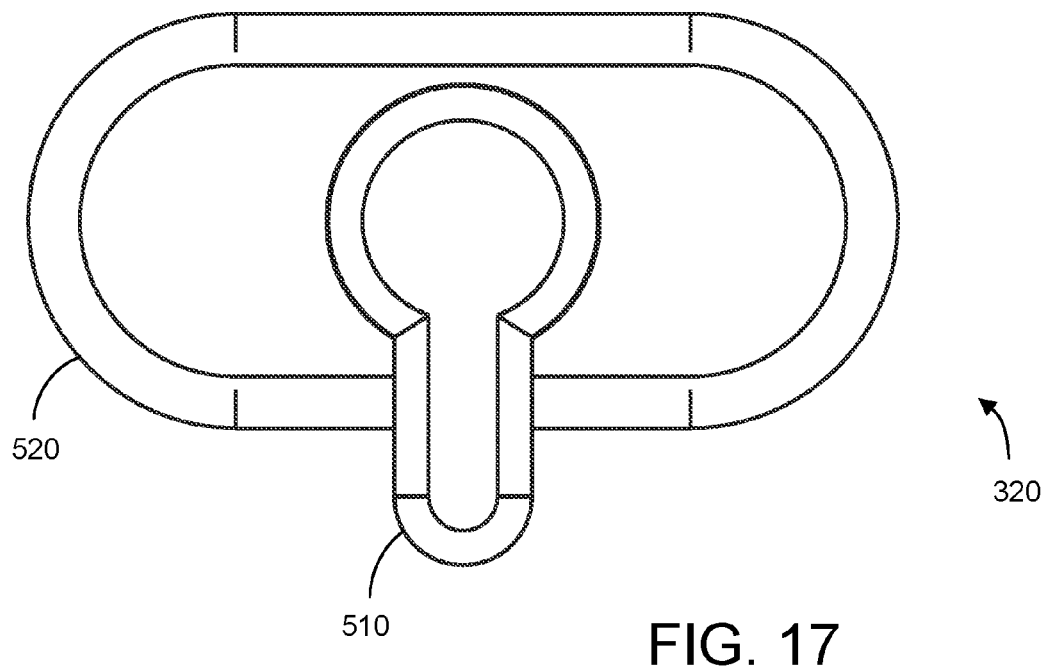
FIG. 17 is a front view of the mixing valve of the multiple proportion delivery systems.

FIG. 17 is a front view of mixing valve 320 showing the control handle 510 and a decorative cover plate 520.

Figure 18:
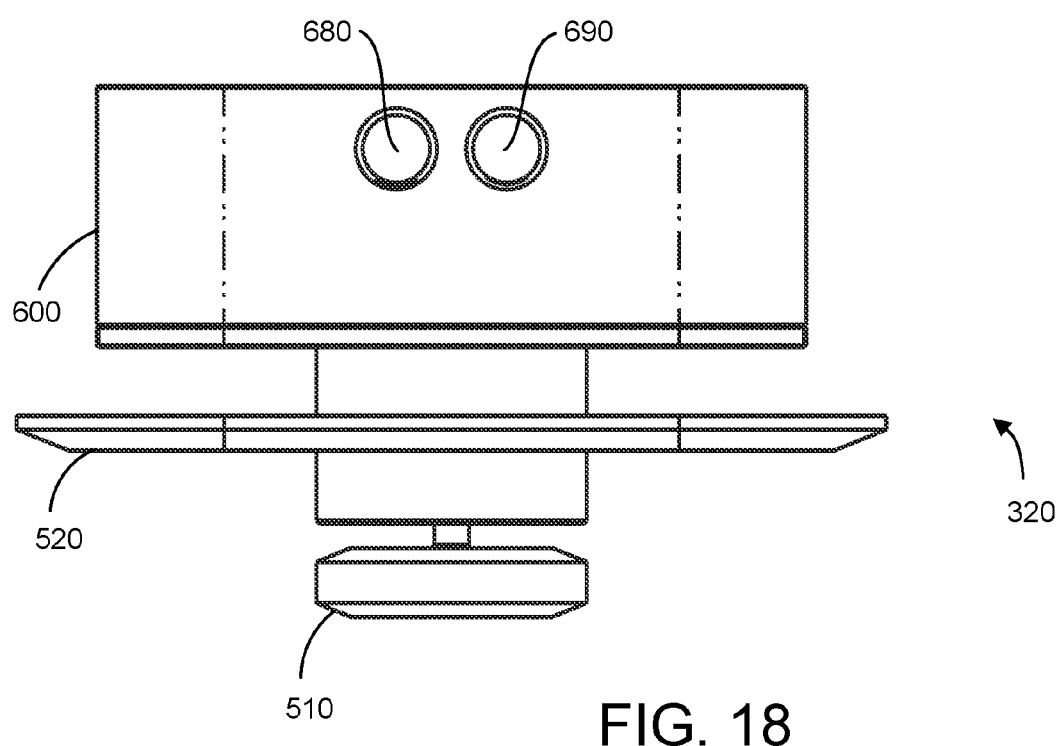
FIG. 18 is a top view of the mixing valve of the multiple proportion delivery systems.

FIG. 18 is a top view of mixing valve 320 showing control handle 510, decorative plate 520, valve body 600, a left fluid mixture egress port 680 and a right fluid mixture egress port 690.

FIG. 19 is a left view of mixing valve 320 showing control handle 510, decorative plate 520, valve body 600 and hot water inlet 610.

FIG. 20 is a right view of mixing valve 320 showing control handle 510, decorative plate 520, valve body 600 and cold water inlet 620.

FIG. 21 is a bottom view of mixing valve 320 showing control handle 510, decorative plate 520 and valve body 600.

Figure 22:
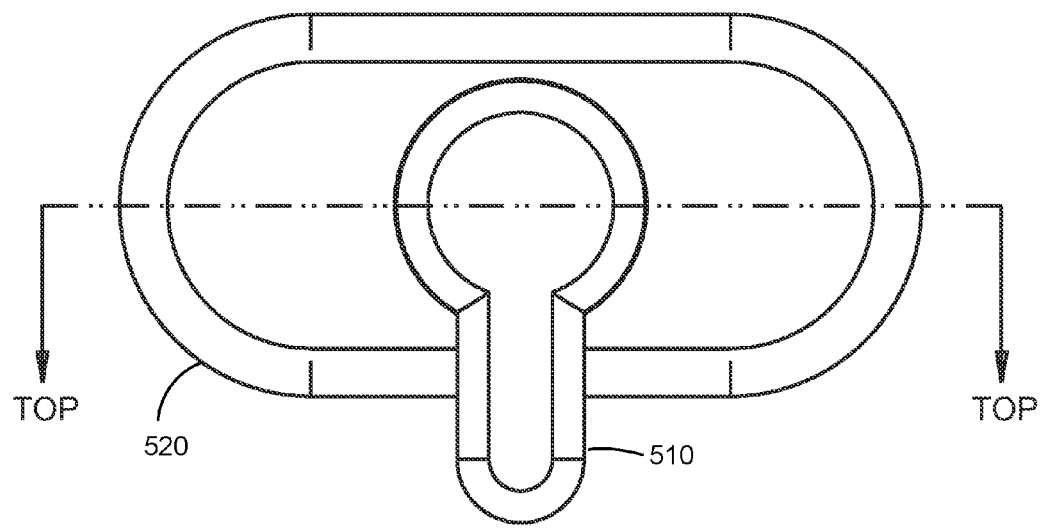
FIG. 22 illustrates a front view of a control mechanism of a mixing valve.
Figure 23:
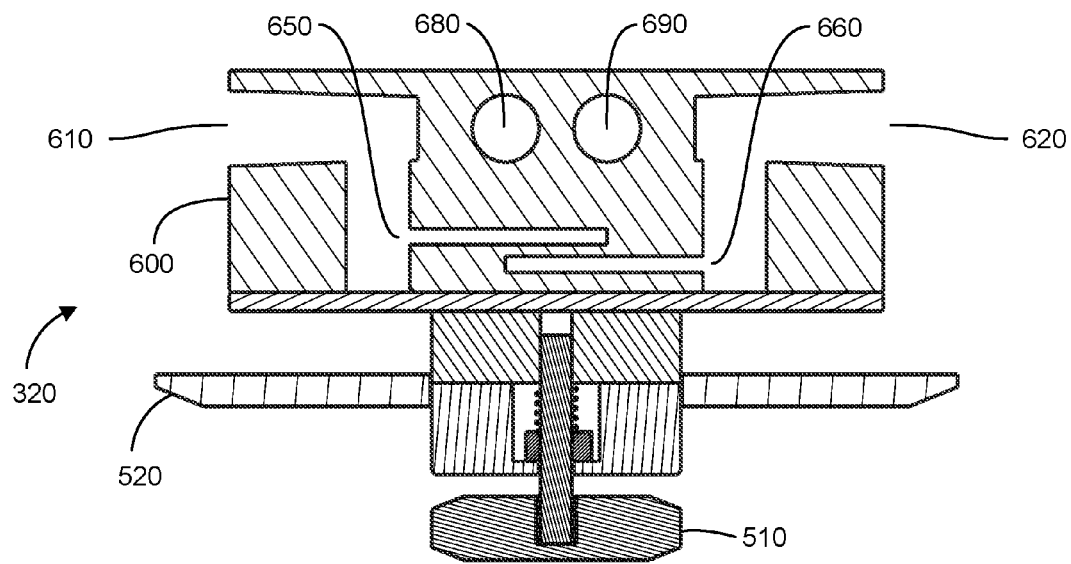
FIG. 23 illustrates the two fluid flow entrance paths of the mixing valve.

The two fluid flow entrance paths may be seen in FIGS. 22 and 23. FIG. 22 is a front view of mixing valve 320 indicating a planer cross-section TOP. Cross-section TOP intersects two distribution channels 650 and 660. Hot water enters through port 610. Delivery channel 650 is in fluid communication with hot water inlet 610. Cold water enters through port 620. Delivery channel 660 is in fluid communication with cold water inlet 620. Delivery channels 650 and 660 each supply a fluid flow to two mixing cartridges as described below.

Figure 24:
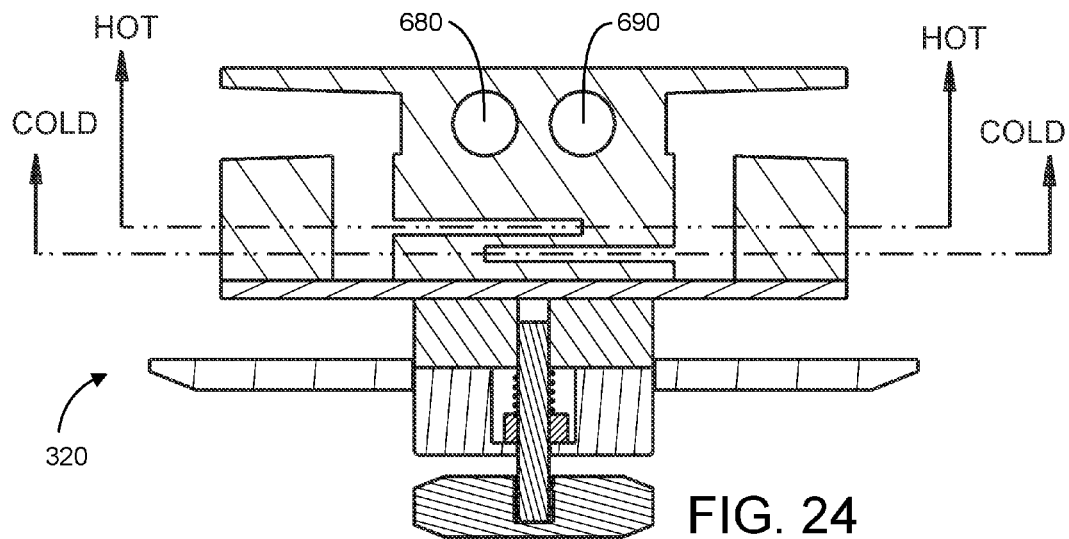
FIG. 24 is a cross-section view of the fluid path of the mixing cartridges.
Figure 25:
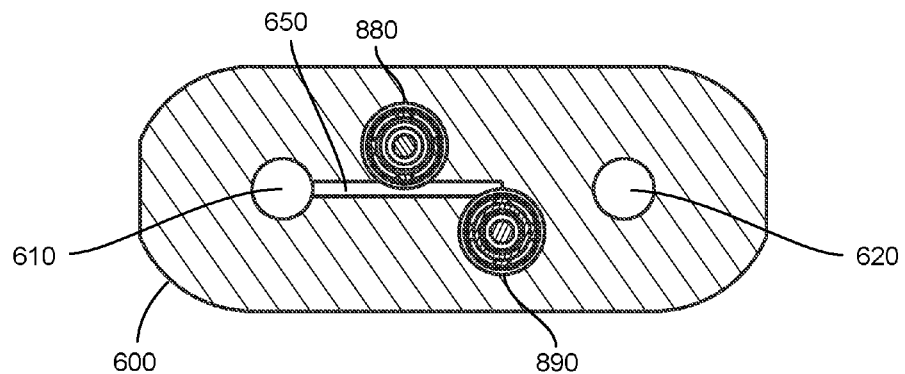
FIG. 25 is a detailed view of the fluid path to the mixing cartridge.
Figure 26:
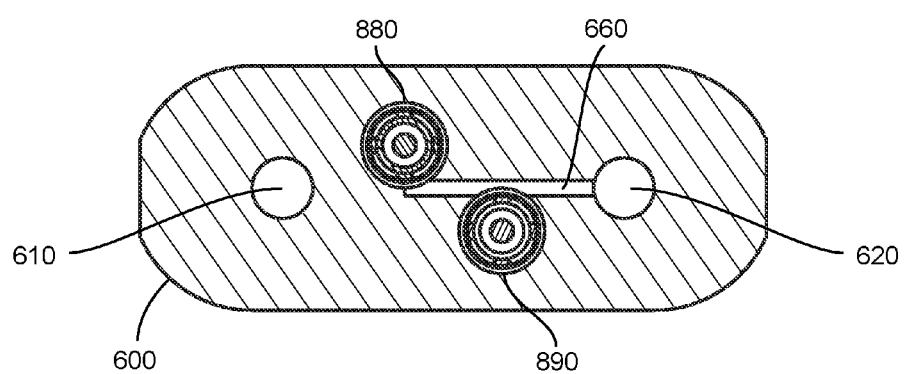
FIG. 26 is detailed views of the fluid path to another mixing cartridge.

FIGS. 24, 25 and 26 further detail the fluid path to the mixing cartridges. FIG. 24 is an identical view to FIG. 23 with two additional cross-sections indicated. Cross section HOT intersects distribution channel 650 in a plane parallel to the front plane. Cross section COLD intersects distribution channel 660 in a plane parallel to the front plane. FIG. 25 shows an inlet port 610 that supplies fluid to distribution channel 650. The distribution channel 650 supplies fluid to the hot portion of mixing valve cartridges 880 and 890. The same can be seen in FIG. 26 for the cold water supply. Inlet port 620 supplies fluid to distribution channel 660, which supplies fluid to the cold portion of mixing valve cartridges 880 and 890.

Figure 27:
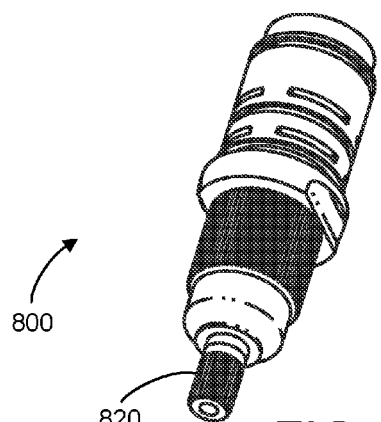
FIG. 27 is a trimetric view of a mixing cartridge.

FIG. 27 shows a trimetric view of a mixing cartridge 800. Such cartridges are commonly used to mix two supplies of fluid into one mixture. Those skilled in the art will immediately recognize this mechanism. It is described here to show that two such cartridges working in coordinated fashion can supply two distinct and precisely controlled fluid mixtures.

Figure 28:
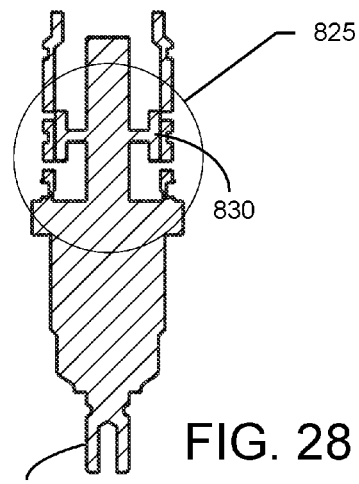
FIG. 28 is another view of the mixing cartridge of FIG. 27.
Figure 29:
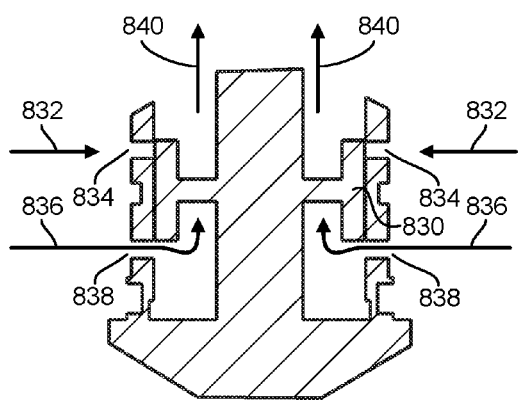
FIG. 29 illustrates a mixing state of the mixing cartridge based on a plunger position.
Figure 30:
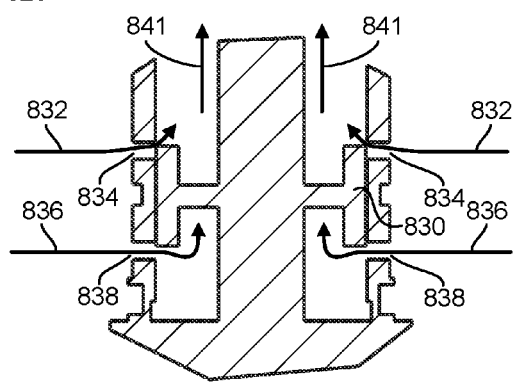
FIG. 30 illustrates a mixing state of the mixing cartridge based on a plunger position.
Figure 31:
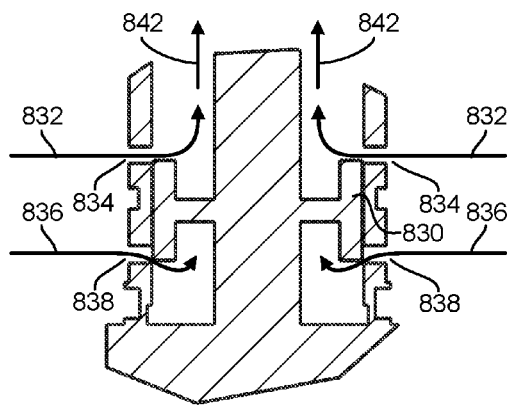
FIG. 31 illustrates a mixing state of the mixing cartridge based on a plunger position.
Figure 32:
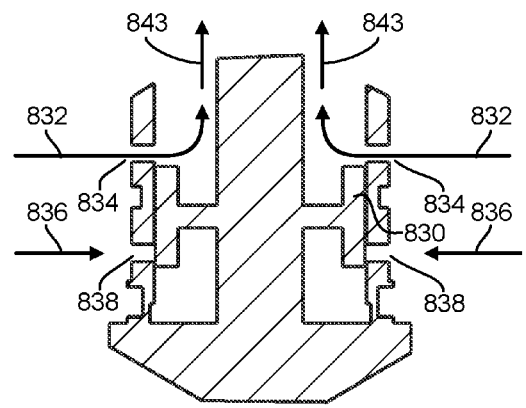
FIG. 32 illustrates a mixing state of the mixing cartridge based on a plunger position.

By movably rotating the spline 820 either directly or through mechanical means such as an attached handle or through a gearing arrangement as is the case with the current embodiment, the valve cartridge moves a plunger 830 shown in FIG. 28, which opens one gate while closing another gate, thus changing the ratio of the fluids to be mixed. FIGS. 29-32 detail four mixing states based on the position of plunger 830. As hot water 832 enters valve cartridge port 834, which is supplied from the previously described distribution channel 650, it is mixed with cold water 836 entering valve cartridge port 838, which is supplied from the previously described distribution channel 660. The resulting mixture 840-843 continues downstream. FIG. 29 shows no hot water 832 entering port 834 since plunger 830 is obstructing its path. Cold water 836 is allowed to flow freely through port 838 since plunger 830 is not obstructing its path. The resulting mixture 840 is cold. In FIG. 30 the plunger 830 has been moved down, allowing some hot water 832 to pass and obstructing the cold water flow 836 somewhat resulting in cool water mixture 841. Similarly FIG. 31 shows a warm water mixture 842 and FIG. 30 shows a hot water mixture 843. By utilizing two or more of such mixing valve cartridges, two or more distinct fluid mixtures are obtained.

Figure 33:
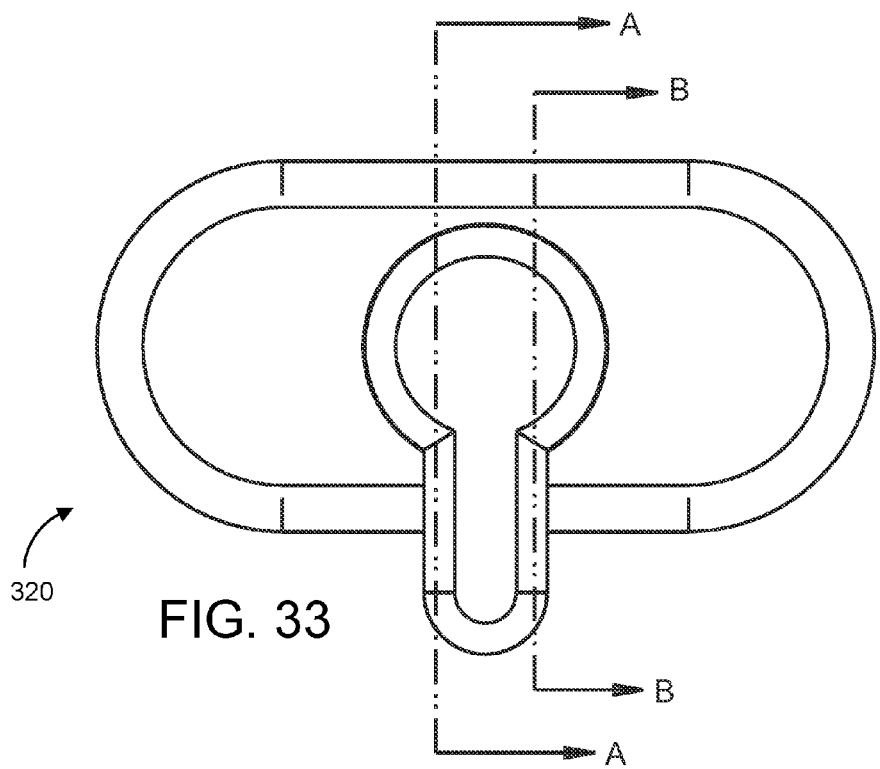
FIG. 33 illustrates a front view of a control mechanism of a mixing valve.
Figures 34, 35:
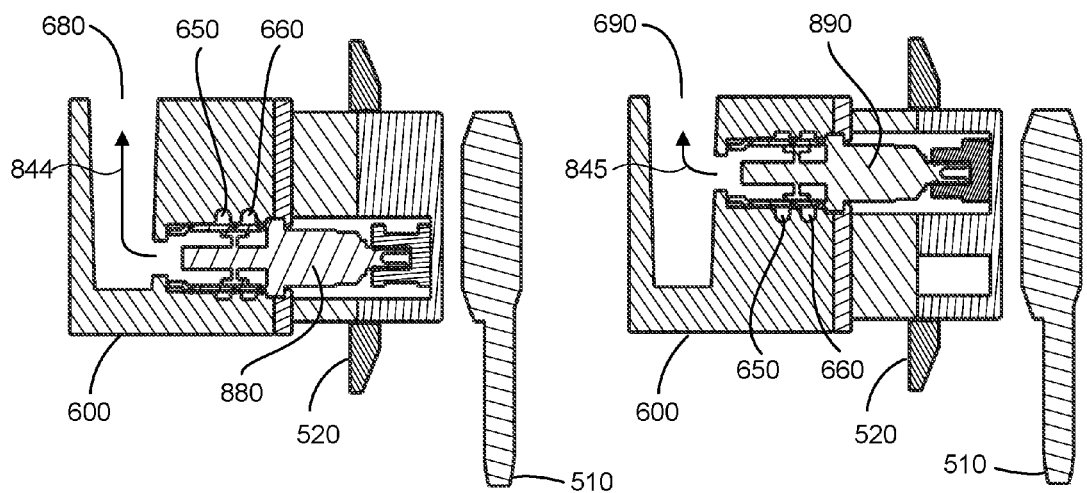
FIG. 34 is a detailed view of the fluid path from one mixing cartridge.
FIG. 35 is a detailed view of the fluid path from another mixing cartridge.

The downstream path of the two fluid mixtures are detailed in FIGS. 33-45. FIG. 33 is a front view of mixing valve 320 indicating two planer cross-sections A and B. Cross-section A intersects the axis of mixing valve cartridge 880 and is parallel to the right plane. Cross-section B intersects the axis of mixing valve cartridge 890 and is parallel to the right plane. Previously described fluid supply delivery channels 650 and 660 can be seen in both FIGS. 34 and 35. Mixing valve cartridge 880 controls the fluid flow 844 thought outlet port 680. Mixing valve cartridge 890 controls the fluid flow 844 through outlet port 690. Thus, two distinct mixed fluids are delivered downstream. It should be noted that such a system is not limited to two mixing cartridges. Additional mixing cartridges can afford additional distinct fluid mixtures.

Coordinated control of each mixture in the current embodiment of at least one of the current inventions is detailed in FIGS. 36-54 with a gearing arrangement 700.

Figure 36:
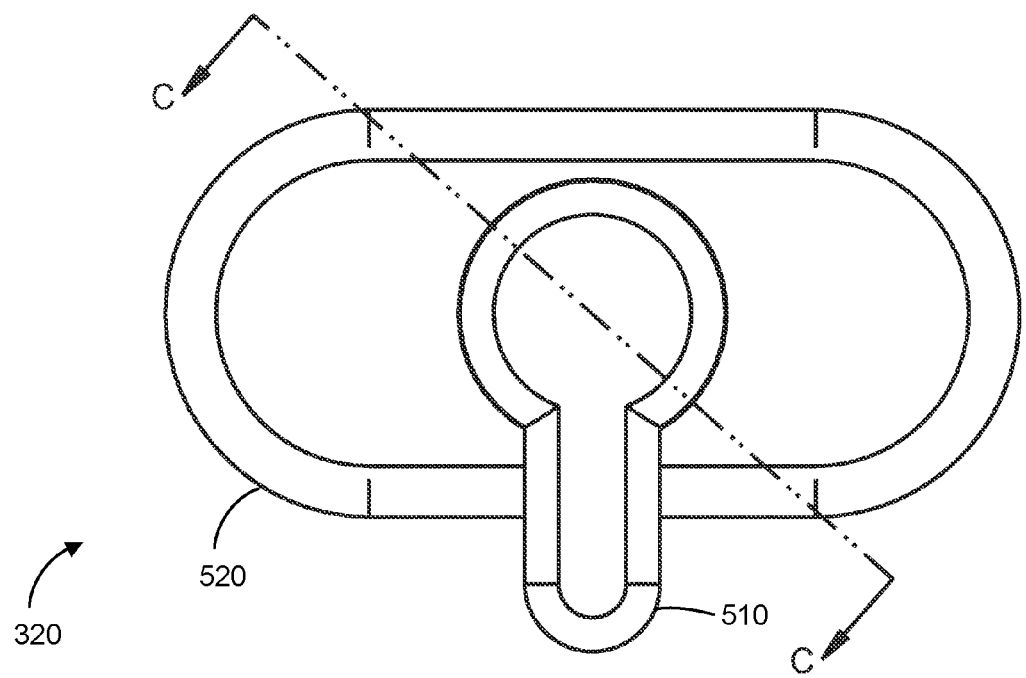
FIG. 36 is a front view of a mixing valve.

FIG. 36 is a front view of mixing valve 320 indicating a planer cross-section C. Cross-section C intersects the axes of two mixing valve cartridges 880 and 890 and is detailed in FIG. 37. Control handle 510 is in fixed relation to control spline 530, which interfaces with gearing arrangement 700. Gearing arrangement 700 is in fixed relation to the mixing valve cartridges splines 820. Supply distribution channels 650 hot and 660 cold as well as mixed fluid delivery ports 680 and 690 can be seen in this view as well.

Figure 41:
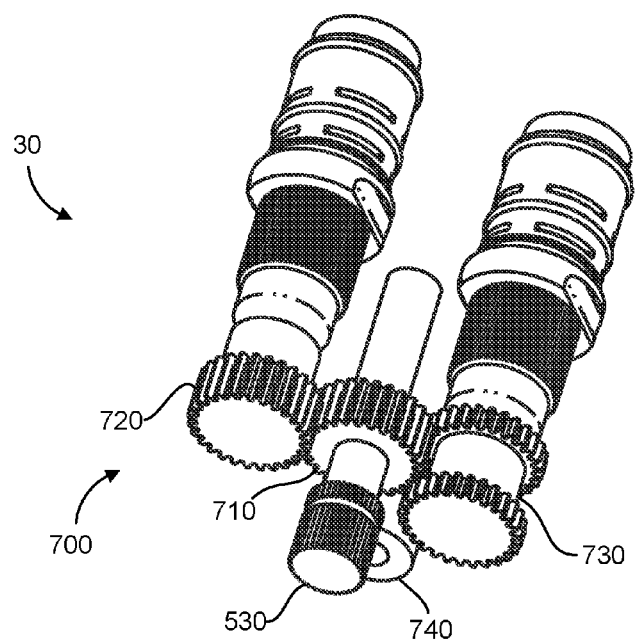
FIG. 41 illustrates another trimetric view of the coordinated mixing mechanism.
Figures 42, 43:
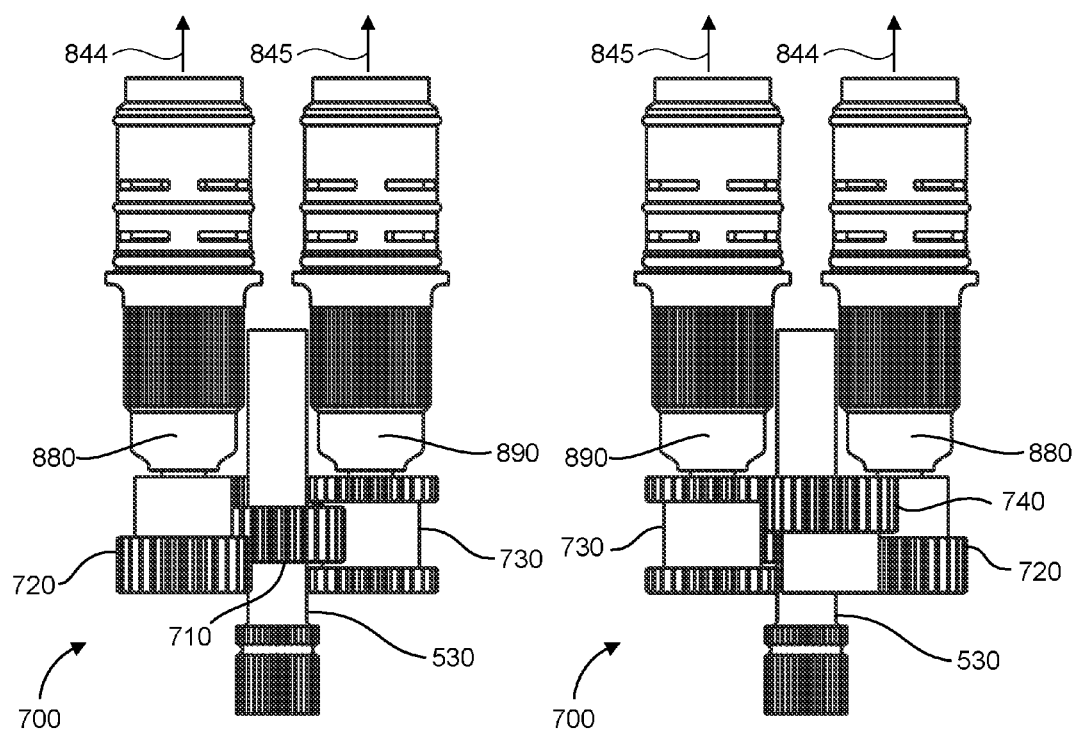
FIG. 42 illustrates another top view of the coordinated mixing mechanism.
FIG. 43 illustrates another bottom view of the coordinated mixing mechanism.

FIGS. 38 and 41 show trimetric views of a coordinated mixing mechanism 30 of at least one of the current inventions. FIGS. 39 and 42 show a top view of coordinated mixing mechanism 30. FIGS. 40 and 43 show a bottom view of coordinated mixing mechanism 30. FIGS. 38-40 show coordinated mixing mechanism 30 in an identical-change state. FIGS. 41-43 show coordinated mixing mechanism 30 in a deviation-change state.

Figure 44:
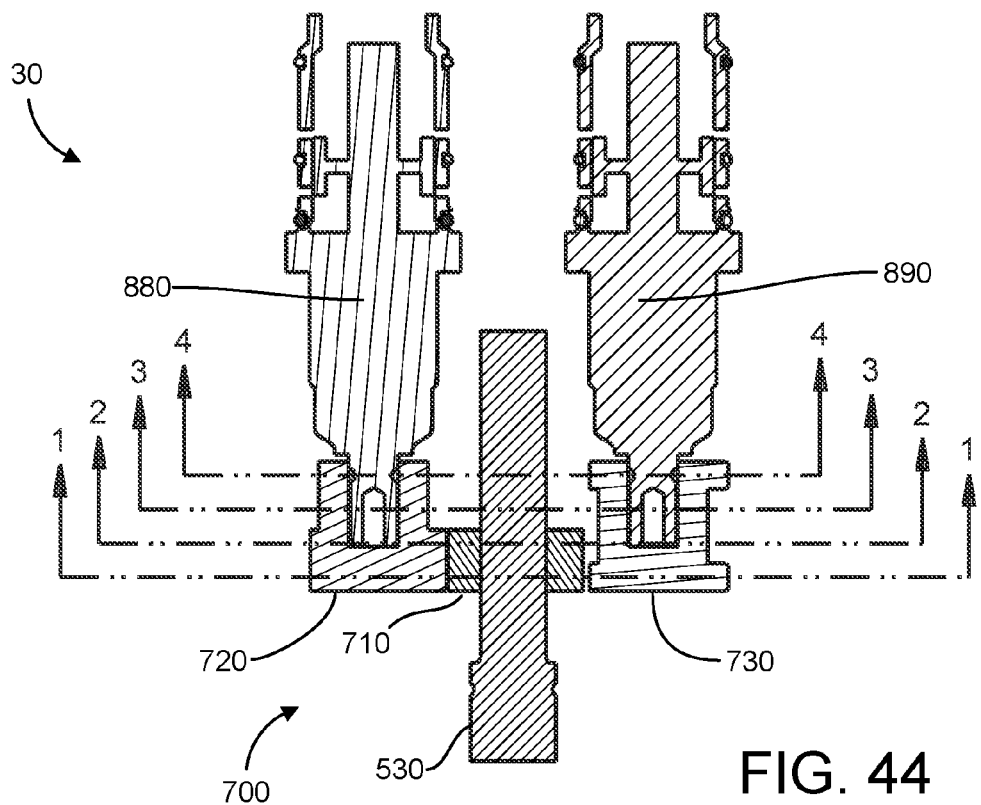
FIGS. 44-54 are detailed views of the gearing arrangement of the mixing valve of the present disclosure.
Figure 47:
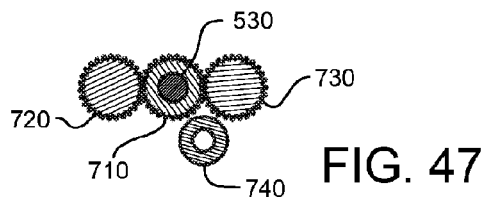
Figure 51:
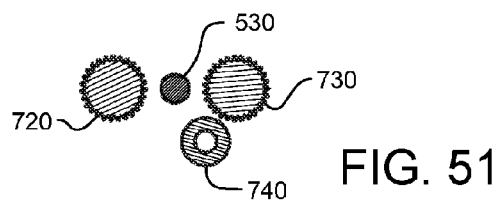
Figure 48:
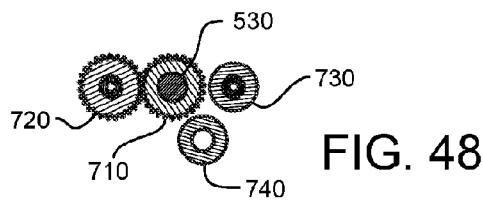
Figure 52:
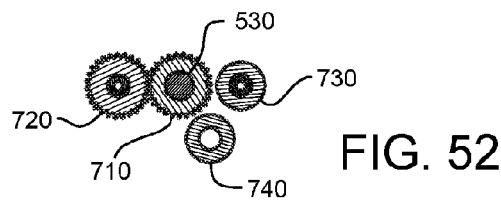
Figure 49:
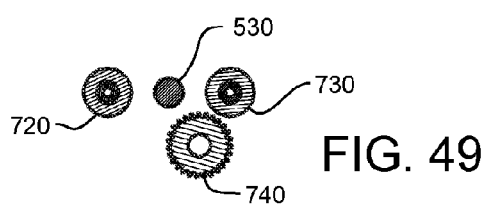
Figure 53:
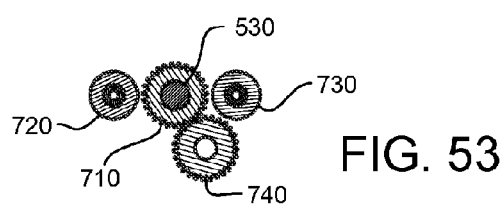
Figure 50:
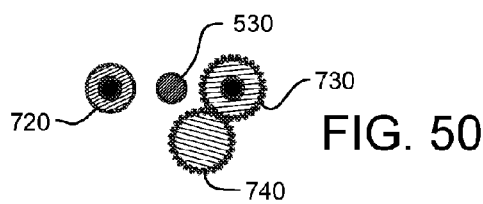

Referring now to FIGS. 38-40, control spline 530 is in fixed relation to gear 710. Gear 710 interfaces with pinions 720 and 730. Pinion 740 is allowed to rotate, but does not affect the control of the mixing mechanism. Referring to FIGS. 39, 44 and 47, gear 710 is in geared communication with pinions 720 and 730. Pinion 740 is in geared communication with pinion 730 as shown in FIGS. 40 and 50, however, pinion 740 is not in geared communication with any other pinion or spline, such that the action of pinion 740 has does not affect the overall system in the configuration that is shown in FIGS. 40 and 50. As control spline 530 is rotated right, pinions 720 and 730 rotate left through gearing action. Pinion 720 is in fixed relation to control spline on mixing cartridge 880. Pinion 730 is in fixed relation to control spline on mixing cartridge 890 as previously described. Thus, both cartridges 880 and 890 are changed in identical direction resulting in an identical fluid mixture change.

Figure 54:
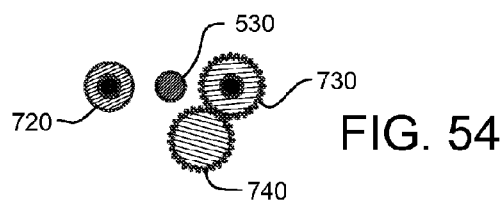

Referring now to FIGS. 41-43, control spline 530 has been moved forward along its axis. Control spline 530 is in fixed relation to gear 710. Gear 710 interfaces with pinions 720 and 740. Pinion 740 interfaces with pinion 730. Gear 710 is no longer directly interfaced with pinion 730, but rather through pinion 740. Referring FIGS. 42, 45, 52 and 53, spline 530 is in a forward position, gear 710 is no longer in geared communication with pinion 730, but rather gear 710 lies in a gap of pinion 730, thus gear 710 no longer directly controls pinion 730. However, referring to FIGS. 43 and 53, gear 710 is in geared communication with pinion 740. Pinion 740 is in geared communication with pinion 730 as shown in FIGS. 43 and 54. As control spline 530 is rotated right, pinions 720 and 740 rotate left through commonly understood gearing action. Pinion 720 is in fixed relation to control spline on mixing cartridge 880. As pinion 740 rotates left, pinion 730 rotates right through gearing action. Pinion 730 is in fixed relation to control spline on mixing cartridge 890 as previously described. Thus, cartridges 880 and 890 are changed in opposite direction resulting in a deviated fluid mixture change.

FIGS. 44-54 detail the gearing arrangement and change in control from identical to deviated.

Figure 37:
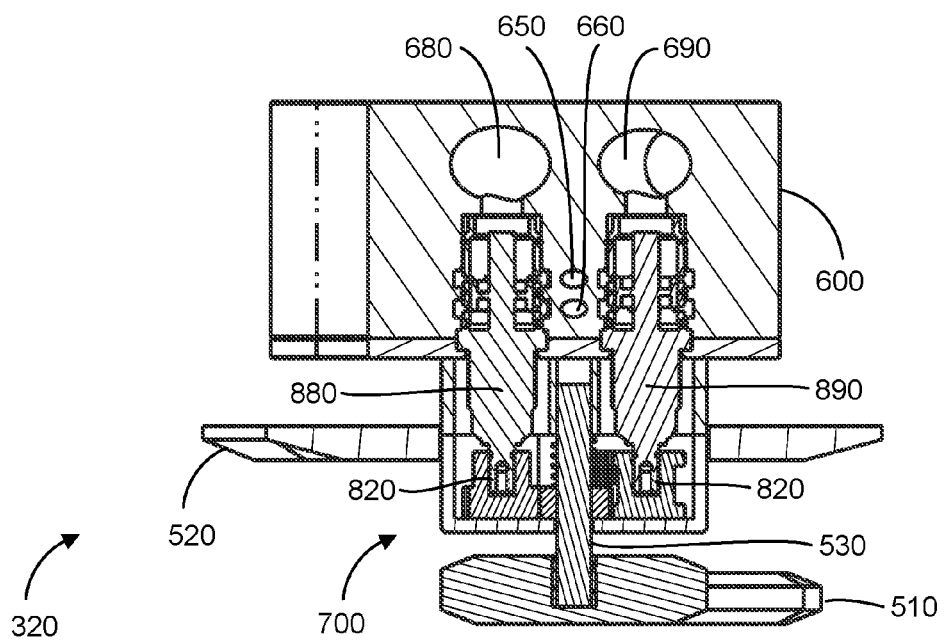
FIG. 37 is a cross-sectional view of the mixing valve of FIG. 36.
Figure 45:
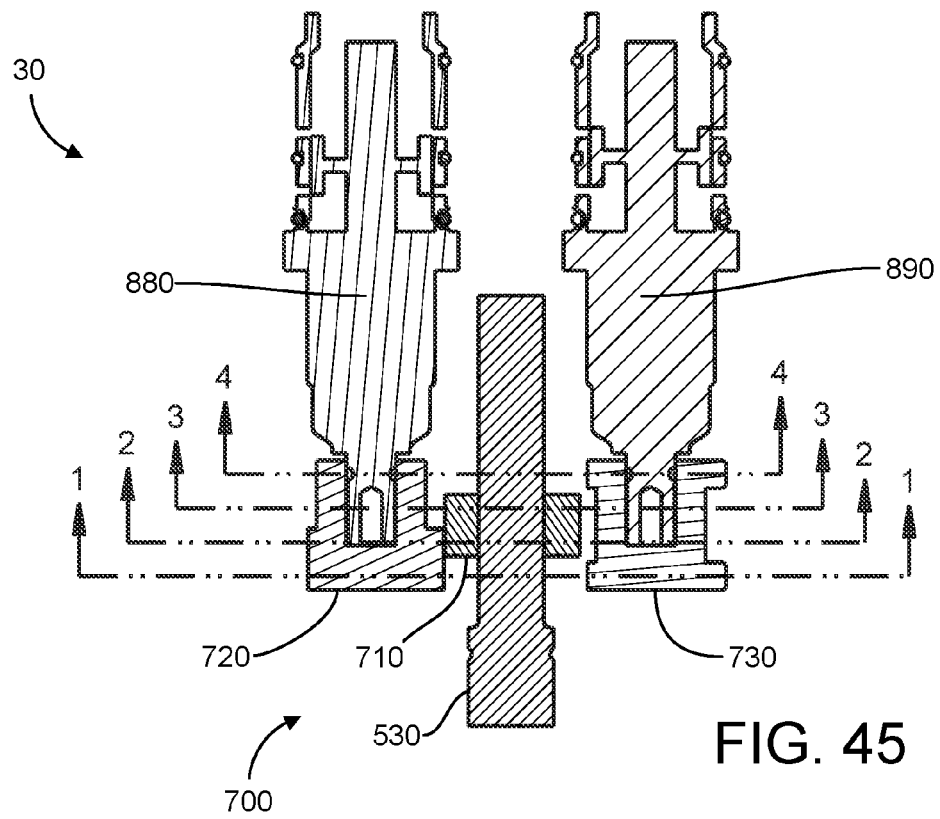

FIGS. 44-45 show an area cross-section of coordinated mixing mechanism 30 through section C described in FIG. 37. Cross-sections 1-4 are taken in a plane parallel to the front plane at four key locations along the gearing arrangement 700. FIG. 44 shows coordinated mixing mechanism 30 in an identical-change state. FIG. 45 shows coordinated mixing mechanism 30 in a deviation-change state wherein control spline 530 has been moved forward thus changing the gearing state.

Figure 46:
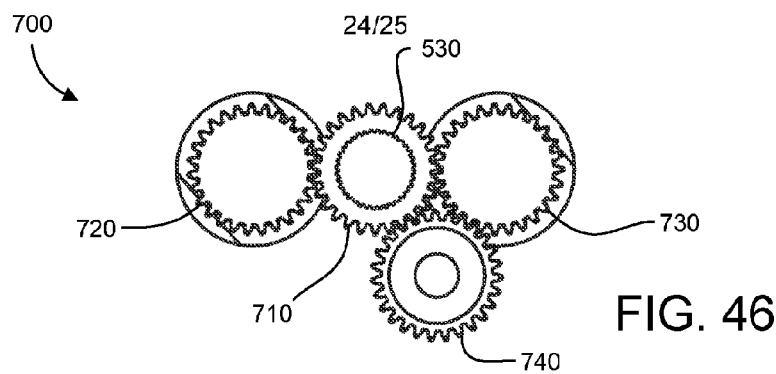

FIG. 46 shows the gearing arrangement 700 from the front with the top parallel to section C.

FIGS. 47-50 correspond to cross-sections 1-4 from FIG. 44, which is in the identical-change state. Control spline 530 is in fixed relation to gear 710. As control spline 530 is rotated right, gear 710 rotates right while pinions 720 and 730 rotate left. Pinion 740 is not directly engaged with gear 710 and thus does not affect the control mechanism 30. Pinion 720 is in fixed relation to cartridge spline 821, and pinion 730 is in fixed relation to cartridge spline 822. Since pinion 740 rotates identically to pinion 730, cartridge spline 821 rotates identically to cartridge spline 822 and identical control is achieved.

FIGS. 51-54 correspond to cross-sections 1-4 from FIG. 45, which is in the deviation-change state. Control spline 530 is in fixed relation to gear 710. As control spline 530 is rotated right, gear 710 rotates right while pinions 720 (FIG. 52) and 740 (FIG. 53) rotate left. Pinion 740 is directly engaged with gear 730 (FIG. 50) and thus turns pinion 730 right. Pinion 720 is in fixed relation to cartridge spline 821, and pinion 730 is in fixed relation to cartridge spline 822. Since pinion 740 rotates opposite pinion 730, cartridge spline 821 rotates opposite cartridge spline 822 and deviation control is achieved.

The resulting two distinct fluid mixtures can then be conveyed with common plumbing pipe for delivery to the user.

Figure 55:
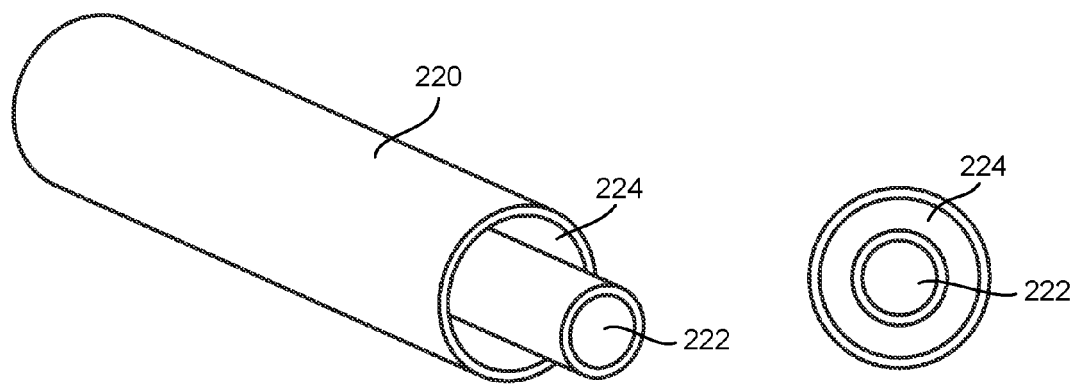
FIGS. 55-56 illustrate two possible conduits for subsequent delivery of two distinct fluid mixtures of the present disclosure.
Figure 56:
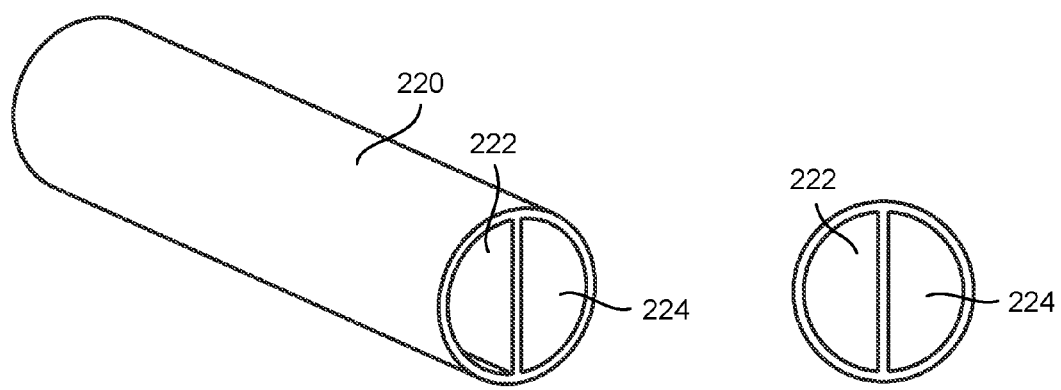

FIGS. 55-56 detail two possible conduits for subsequent delivery of two distinct fluid mixtures. Such combined conduits are common and may be used to supply the two fluid flows to remote devices such as a hand-held showerhead. One fluid mixture is channeled through 224 while the other is channeled through 222.

Thus it has been shown that through one movement of control handle 510, both identical change and deviation change of two fluid mixtures can be achieved with precise control and for delivery to the user. Such utility is not afforded by any prior art and thus constitutes an invention.

The systems described herein often refer to bathing and water temperature. The systems described herein may also be used to carry other fluids such as ink, plastics, or foodstuffs of different colors, or of different acidity, or even gases of different chemical composition. For example, a hose made by extrusion of plastics may be made of different colored stripes that blend into a single color and then back into separate colors. As another example of an implementation of the system, a cookie may be made to be either neutral or mixed sweet and sour within the same batch. As another example, the ability to blend two fluids from a homogenous mixture into distinct flows different in composition, temperature, or otherwise allows for a unique experience not otherwise attainable.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure. In other embodiments, the two channels may change the temperature of the fluid equally or unequally relative to each other.

What is claimed is:

1. A valve, comprising:
   a control spline positioned to move from a first position to a second position and the control spline being axially rotatable in both the first position and second position;
   a portion of a first fluid mixing cartridge rotatably coupled to at least one portion of the control spline when the control spline is in the second position;
   a portion of a second fluid mixing cartridge rotatably coupled to the at least one portion of the control spline when the control spline is in the second position;
   wherein the first fluid mixing cartridge is configured to rotate in a different direction than the second fluid mixing cartridge when the control spline is in the second position;
   wherein the first fluid mixing cartridge is configured to generate a first mixture of water that is configured to flow from a first outlet to a fluid releasing mechanism in a first pipe;
   wherein the second fluid mixing cartridge is configured to generate a second mixture of water that is configured to flow from a second outlet to the fluid releasing mechanism in a second pipe; and
   wherein the first mixture of water and the second mixture of water are released as separate mixtures from the fluid releasing mechanism.

2. The valve of claim 1, wherein the first fluid cartridge further comprising an inlet that is configured to receive cold water from a cold water intake and another inlet to receive hot water from a hot water intake of the valve.

3. The valve of claim 1, wherein the second fluid mixing cartridge further comprising an inlet that is configured to receive cold water from a cold water intake and another inlet to receive hot water from a hot water intake of the valve.

4. The valve of claim 1, wherein the first fluid mixing cartridge is configured to rotate in a first mode with the second fluid mixing cartridge when the control spline is in the first position such that the first fluid mixing cartridge and the second fluid mixing cartridge are configured to change fluid mixture properties equally relative to each other.

5. The valve of claim 1, wherein the first position of the control spline places the first fluid mixing cartridge and the second fluid mixing cartridge in a first mode such that the first fluid mixing cartridge and the second fluid mixing cartridge are configured to change fluid mixture properties equally relative to each other.

6. The valve of claim 1, wherein the second position of the control spline places the first fluid mixing cartridge and the second fluid mixing cartridge in a particular mode such that the first fluid mixing cartridge and the second fluid mixing cartridge are configured to change fluid mixture properties oppositely relative to each other.

7. The valve of claim 1, wherein the first fluid mixing cartridge is configured to rotate in an opposite direction than the second fluid mixing cartridge when the control spline is in the second position.

8. A valve, comprising:
   a control spline positioned to move from a second position to a first position and the control spline being axially rotatable in both the first position and second position;
   a portion of a first fluid mixing cartridge rotatably coupled to at least one portion of the control spline when the control spline is in the first position;
   a portion of a second fluid mixing cartridge rotatably coupled to the at least one portion of the control spline when the control spline is in the first position;
   wherein the first fluid mixing cartridge is configured to rotate in a same direction as the second fluid mixing cartridge when the control spline is in the first position;
   wherein the first fluid mixing cartridge is configured to generate a first mixture of water that is configured to flow from a first outlet to a fluid releasing mechanism in a first pipe;
   wherein the second fluid mixing cartridge is configured to generate a second mixture of water that is configured to flow from a second outlet to the fluid releasing mechanism in a second pipe; and
   wherein the first mixture of water and the second mixture of water are released as separate mixtures from the fluid releasing mechanism.

9. The valve of claim 8, wherein the first fluid cartridge further comprising an inlet that is configured to receive cold water from a cold water intake and another inlet to receive hot water from a hot water intake of the valve.

10. The valve of claim 8, wherein the second fluid mixing cartridge further comprising an inlet that is configured to receive cold water from a cold water intake and another inlet to receive hot water from a hot water intake of the valve.

11. The valve of claim 8, wherein the first fluid mixing cartridge is configured to rotate in a first mode with the second fluid mixing cartridge when the control spline is in the first position such that the first fluid mixing cartridge and the second fluid mixing cartridge are configured to change fluid mixture properties equally relative to each other.

12. The valve of claim 8, wherein the first position of the control spline places the first fluid mixing cartridge and the second fluid mixing cartridge in a first mode such that the first fluid mixing cartridge and the second fluid mixing cartridge are configured to change fluid mixture properties equally relative to each other.

13. The valve of claim 8, wherein the second position of the control spline places the first fluid mixing cartridge and the second fluid mixing cartridge in a particular mode such that the first fluid mixing cartridge and the second fluid mixing cartridge are configured to change fluid mixture properties oppositely relative to each other.

14. A valve, comprising:
a control spline positioned to move from a second position to a first position and the control spline being axially rotatable in both the first position and second position;
a portion of a first fluid mixing cartridge rotatably coupled to at least one portion of the control spline when the control spline is in the first position;
a portion of a second fluid mixing cartridge rotatably coupled to the at least one portion of the control spline when the control spline is in the first position;
wherein the first fluid mixing cartridge is configured to rotate in a same direction as the second fluid mixing cartridge when the control spline is in the first position; and
wherein the second position of the control spline places the first fluid mixing cartridge and the second fluid mixing cartridge in a particular mode such that the first fluid mixing cartridge and the second fluid mixing cartridge are configured to change fluid mixture properties oppositely relative to each other.

\* \* \* \* \*